US008131708B2

(12) United States Patent
Lu et al.

(10) Patent No.: US 8,131,708 B2
(45) Date of Patent: Mar. 6, 2012

(54) METHODS AND SYSTEMS FOR MONITORING AND TRACKING VIDEOS ON THE INTERNET

(75) Inventors: Jian Lu, Cupertino, CA (US); Lun Cui, Fremont, CA (US)

(73) Assignee: Vobile, Inc., Santa Clara, CA (US)

( * ) Notice: Subject to any disclaimer, the term of this patent is extended or adjusted under 35 U.S.C. 154(b) by 628 days.

(21) Appl. No.: 12/262,004

(22) Filed: Oct. 30, 2008

(65) Prior Publication Data

US 2009/0324006 A1 Dec. 31, 2009

Related U.S. Application Data

(60) Provisional application No. 61/133,640, filed on Jun. 30, 2008.

(51) Int. Cl.
*G06F 17/30* (2006.01)
(52) U.S. Cl. .............. 707/709; 707/785; 707/770; 725/9
(58) Field of Classification Search .................. 707/709, 707/758, 770; 725/9, 22, 32
See application file for complete search history.

(56) References Cited

U.S. PATENT DOCUMENTS

| | | | | |
|---|---|---|---|---|
| 5,903,317 | A * | 5/1999 | Sharir et al. | 348/589 |
| 6,297,853 | B1 * | 10/2001 | Sharir et al. | 348/589 |
| 6,691,229 | B1 * | 2/2004 | Nelson | 713/193 |
| 7,769,197 | B2 * | 8/2010 | Fujii et al. | 382/100 |
| 7,930,213 | B1 * | 4/2011 | Philyaw et al. | 705/26.1 |
| 2003/0028796 | A1 * | 2/2003 | Roberts et al. | 713/193 |
| 2004/0071443 | A1 * | 4/2004 | Kawamae et al. | 386/94 |
| 2004/0080528 | A1 * | 4/2004 | Rand et al. | 345/738 |
| 2004/0233233 | A1 * | 11/2004 | Salkind et al. | 345/719 |
| 2005/0060324 | A1 * | 3/2005 | Johnson et al. | 707/100 |
| 2005/0182824 | A1 * | 8/2005 | Cotte | 709/217 |
| 2006/0217881 | A1 * | 9/2006 | Pei et al. | 701/208 |
| 2006/0230011 | A1 * | 10/2006 | Tuttle et al. | 706/62 |
| 2006/0235723 | A1 * | 10/2006 | Millard | 705/1 |
| 2006/0294571 | A1 * | 12/2006 | Moore et al. | 725/135 |
| 2007/0245243 | A1 * | 10/2007 | Lanza et al. | 715/723 |
| 2008/0086747 | A1 * | 4/2008 | Rasanen et al. | 725/46 |
| 2008/0092189 | A1 * | 4/2008 | Baker et al. | 725/112 |
| 2008/0106597 | A1 * | 5/2008 | Amini et al. | 348/143 |
| 2008/0154889 | A1 * | 6/2008 | Pfeiffer | 707/5 |
| 2008/0178242 | A1 * | 7/2008 | Eyal et al. | 725/115 |
| 2008/0184119 | A1 * | 7/2008 | Eyal et al. | 715/719 |
| 2008/0228749 | A1 * | 9/2008 | Brown | 707/5 |
| 2008/0279536 | A1 * | 11/2008 | Levy | 386/95 |
| 2008/0298571 | A1 * | 12/2008 | Kurtz et al. | 379/156 |
| 2008/0320391 | A1 * | 12/2008 | Lemay et al. | 715/702 |
| 2009/0092374 | A1 * | 4/2009 | Kulas | 386/95 |
| 2009/0094520 | A1 * | 4/2009 | Kulas | 715/723 |

\* cited by examiner

*Primary Examiner* — Hanh Thai
(74) *Attorney, Agent, or Firm* — Jones Day

(57) ABSTRACT

Method and system for discovering and identifying a video object. The method includes crawling at least one predetermined website, discovering at least one video link at the predetermined website, processing information associated with a first database for storing one or more video links, and determining whether the discovered video link was already discovered before based on at least information associated with the first database. Additionally, the method includes, if the discovered video link is determined not to have been discovered before, updating the first database based on at least information associated with the discovered video link, downloading at least one video object based on at least information associated with the discovered video link, and processing information associated with the downloaded video object.

11 Claims, 32 Drawing Sheets

Figure 5

METHODS AND SYSTEMS FOR MONITORING AND TRACKING VIDEOS ON THE INTERNET

CROSS-REFERENCES TO RELATED APPLICATIONS

This application claims priority to U.S. Provisional No. 61/133,640, filed Jun. 30, 2008, commonly assigned, incorporated by reference herein for all purposes.

Additionally, this application is related to U.S. patent application Ser. Nos. 11/681,567 and 11/949,511, which are incorporated by reference herein for all purposes.

BACKGROUND OF THE INVENTION

The present invention is directed to tracking video distributions. More particularly, the invention provides methods and systems for finding and identifying videos being distributed on the Internet, and/or collecting and presenting tracking data about the identified videos over a period of time. Merely by way of example, the invention has been applied to tracking videos on the Internet. But it would be recognized that the invention has a much broader range of applicability.

The Internet has become a distribution platform for various types of media. Recently, video distributions over the Internet grow rapidly into a social and cultural phenomenon. An enormous number of videos have flooded onto the Internet, and these videos often require effective monitoring and tracking. For example, content owners of various videos want to monitor and track unauthorized distributions of their video contents, so that appropriate actions, such as sending take-down notices, can be taken. In another example, marketers of various videos also need to monitor and track distributions of the videos in order to determine their popularity and study their pattern of consumption.

The conventional techniques of tracking video distributions often lack sufficient accuracy and is usually not automatic. Hence it is highly desirable to improve techniques for finding and identifying videos.

BRIEF SUMMARY OF THE INVENTION

The present invention is directed to tracking video distributions. More particularly, the invention provides methods and systems for finding and identifying videos being distributed on the Internet, and/or collecting and presenting tracking data about the identified videos over a period of time. Merely by way of example, the invention has been applied to tracking videos on the Internet. But it would be recognized that the invention has a much broader range of applicability.

According to one embodiment, a method for discovering and identifying a video object includes crawling at least one predetermined website, discovering at least one video link at the predetermined website, processing information associated with a first database for storing one or more video links, and determining whether the discovered video link was already discovered before based on at least information associated with the first database. Additionally, the method includes, if the discovered video link is determined not to have been discovered before, updating the first database based on at least information associated with the discovered video link, downloading at least one video object based on at least information associated with the discovered video link, and processing information associated with the downloaded video object. Moreover, the method includes, if the discovered video link is determined not to have been discovered before, determining a first fingerprint for the downloaded video object based on at least information associated with the downloaded video object, processing information associated with at least the first fingerprint for the downloaded video object, determining whether the downloaded video object matches with a video title that is being tracked based on at least information associated with the first fingerprint and a second fingerprint, and if the downloaded video object is determined to match with the video title that is being tracked, updating a second database for storing one or more tracking results. The second fingerprint corresponds to the video title.

According to another embodiment, a computer program product including a computer readable medium including instructions for discovering and identifying a video object. The computer readable medium includes one or more instructions for crawling at least one predetermined website, one or more instructions for discovering at least one video link at the predetermined website, one or more instructions for processing information associated with a first database for storing one or more video links, and one or more instructions for determining whether the discovered video link was already discovered before based on at least information associated with the first database. Additionally, the computer readable medium includes one or more instructions for, if the discovered video link is determined not to have been discovered before, updating the first database based on at least information associated with the discovered video link, downloading at least one video object based on at least information associated with the discovered video link, processing information associated with the downloaded video object, determining a first fingerprint for the downloaded video object based on at least information associated with the downloaded video object, processing information associated with at least the first fingerprint for the downloaded video object, determining whether the downloaded video object matches with a video title that is being tracked based on at least information associated with the first fingerprint and a second fingerprint, and if the downloaded video object is determined to match with the video title that is being tracked, updating a second database for storing one or more tracking results. The second fingerprint corresponds to the video title.

According to yet another embodiment, a method for verifying a video object includes obtaining information associated with a video object from a database for storing one or more tracking results. The obtained information is associated with at least one host website for the video object. Additionally, the method includes verifying whether the video object still exists on the host website based on at least information associated with the at least one host website for the video object. Moreover, the method includes, if the video object is verified to still exist on the host website, downloading updated information associated with the video object from the host website and storing the updated information associated with the video object to the database. Also, the method includes, if the video object is verified to no longer exist on the host website, marking the video object as having been removed from the host website. Additionally, the method includes updating a display of the one or more tracking results.

According to yet another embodiment, a computer program product including a computer readable medium including instructions for verifying a video object. The computer readable medium includes one or more instructions for obtaining information associated with a video object from a database for storing one or more tracking results, the obtained information being associated with at least one host website for the video object, and one or more instructions for verifying whether the video object still exists on the host website based on at least information associated with the at least one host website for the video object. Additionally, the computer readable medium includes one or more instructions for, if the video object is verified to still exist on the host website, downloading updated information associated with the video object from the host website and storing the updated information associated with the video object to the database. Moreover, the computer readable medium includes one or more instructions for, if the video object is verified to no longer exist on the host website, marking the video object as having been removed from the host website. Additionally, the computer readable medium includes one or more instructions for updating a display of the one or more tracking results.

According to yet another embodiment, a method for identifying and verifying a video object includes crawling at least one predetermined website, discovering at least one video link at the predetermined website, processing information associated with a first database for storing one or more video links, and updating the first database based on at least information associated with the discovered video link. Additionally, the method includes downloading at least one video object based on at least information associated with the discovered video link, processing information associated with the downloaded video object, and determining a first fingerprint for the downloaded video object based on at least information associated with the downloaded video object. Moreover, the method includes processing information associated with at least the first fingerprint for the downloaded video object, determining a match between the downloaded video object and a video title that is being tracked based on at least information associated with the first fingerprint and a second fingerprint, updating a second database for storing one or more tracking results, and obtaining information associated with the video object from the second database. The second fingerprint corresponds to the video title, and the obtained information is associated with at least the predetermined website. Also, the method includes verifying whether the video object still exists on the predetermined website based on at least information associated with the predetermined website. Additionally, the method includes, if the video object is verified to still exist on the predetermined website, downloading updated information associated with the video object from the predetermined website, and storing the updated information associated with the video object to the second database. Moreover, the method includes, if the video object is verified to no longer exist on the predetermined website, marking the video object as having been removed from the predetermined website. Also, the method includes updating a display of the one or more tracking results.

According to yet another embodiment, a computer program product including a computer readable medium including instructions for identifying and verifying a video object. The computer readable medium includes one or more instructions for crawling at least one predetermined website, one or more instructions for discovering at least one video link at the predetermined website, one or more instructions for processing information associated with a first database for storing one or more video links, and one or more instructions for updating the first database based on at least information associated with the discovered video link. Additionally, the computer readable medium includes one or more instructions for downloading at least one video object based on at least information associated with the discovered video link, one or more instructions for processing information associated with the downloaded video object, one or more instructions for determining a first fingerprint for the downloaded video object based on at least information associated with the downloaded video object, one or more instructions for processing information associated with at least the first fingerprint for the downloaded video object, and one or more instructions for determining a match between the downloaded video object and a video title that is being tracked based on at least information associated with the first fingerprint and a second fingerprint. The second fingerprint corresponds to the video title. Moreover, the computer readable medium includes one or more instructions for updating a second database for storing one or more tracking results, and one or more instructions for obtaining information associated with the video object from the second database. The obtained information is associated with at least the predetermined website. Also, the computer readable medium includes one or more instructions for verifying whether the video object still exists on the predetermined website based on at least information associated with the predetermined website. Additionally, the computer readable medium includes one or more instructions for, if the video object is verified to still exist on the predetermined website, downloading updated information associated with the video object from the predetermined website, and storing the updated information associated with the video object to the second database. Moreover, the computer readable medium includes one or more instructions for, if the video object is verified to no longer exist on the predetermined website, marking the video object as having been removed from the predetermined website. Also, the computer readable medium includes one or more instructions for updating a display of the one or more tracking results.

Many benefits are achieved by way of the present invention over conventional techniques. Certain embodiments of the present invention use one or more video fingerprints to accurately identify videos in a fully automatic workflow. Some embodiments of the present invention provide a user interface for presenting the tracking data in a timely and dynamic way.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

FIGS. 4-17 are simplified diagrams showing display of tracking results according to certain embodiments of the present invention.

DETAILED DESCRIPTION OF THE INVENTION

The present invention is directed to tracking video distributions. More particularly, the invention provides methods and systems for finding and identifying videos being distributed on the Internet, and/or collecting and presenting tracking data about the identified videos over a period of time. Merely by way of example, the invention has been applied to tracking videos on the Internet. But it would be recognized that the invention has a much broader range of applicability.

Figure 1:
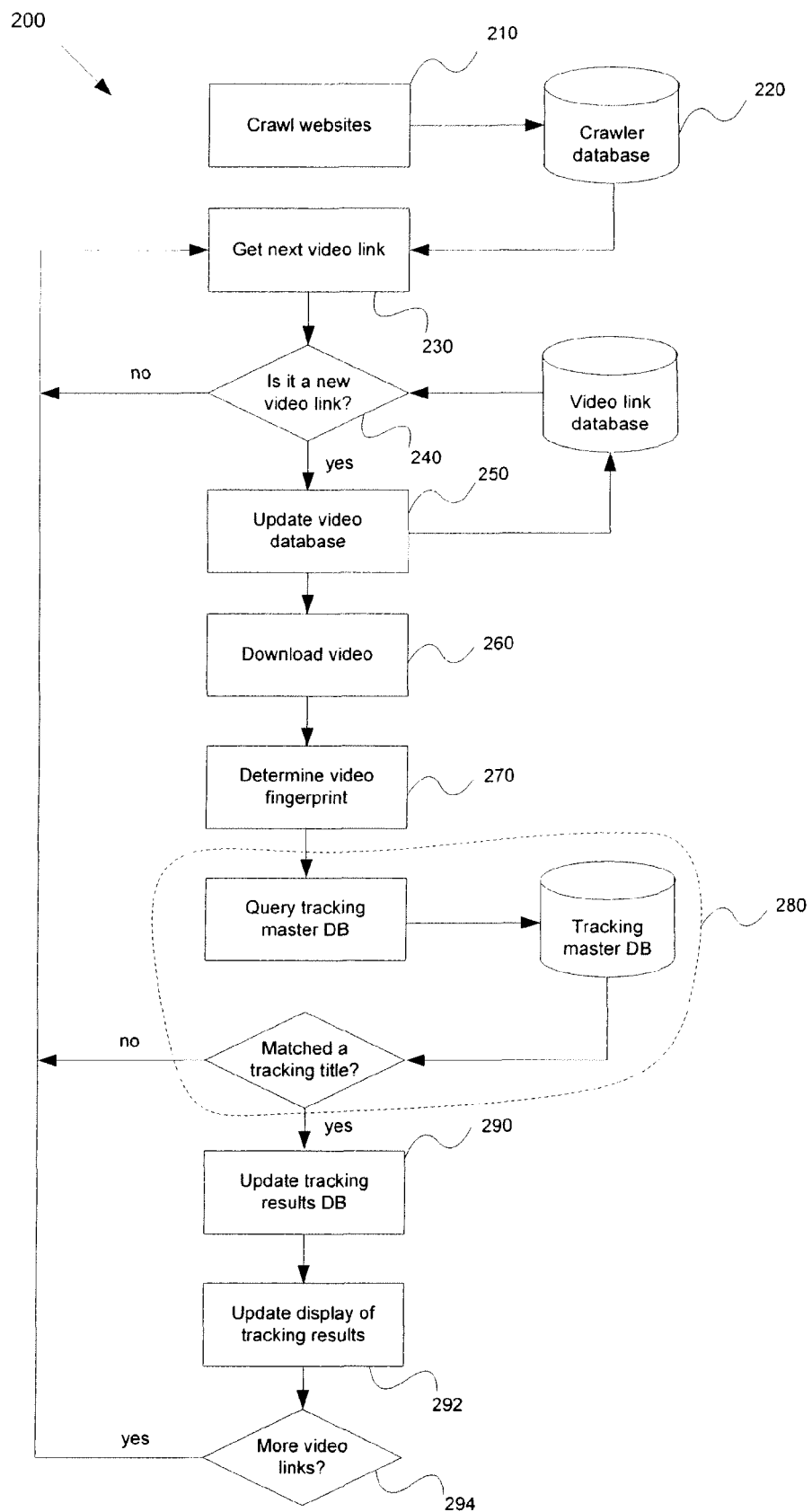
FIG. 1 is a simplified method for discovering and identifying videos according to an embodiment of the present invention.

FIG. 1 is a simplified method for discovering and identifying videos according to an embodiment of the present invention. This diagram is merely an example, which should not unduly limit the scope of the claims. One of ordinary skill in the art would recognize many variations, alternatives, and modifications. The method 200 includes process 210 for crawling websites, process 220 for storing video link to crawler database, process 230 for obtaining video link from crawler database, process 240 for determining whether video link was already discovered, process 250 for updating video link database, process 260 for downloading video, process 270 for determining video fingerprint, process 280 for determining whether downloaded video matches with video title being tracked, process 290 for updating database of tracking results, process 292 for updating display of tracking results, and process 294 for determining whether there is any video link that has not yet been processed. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. As an example, some or all processes of the method are performed by a computer or a processor directed by a code. In another example, some or all processes of the method are performed according to instructions included by a computer-readable medium in a computer program product. In yet another example, the method 200 is performed automatically. Further details of these processes are found throughout the present specification.

According to one embodiment, the method 200 uses a video fingerprinting system. For example, the video fingerprinting system is described in U.S. patent application Ser. No. 11/681,567 and/or U.S. patent application Ser. No. 11/949,511. According to another embodiment, the method 200 is used to discover new videos on websites that are being monitored, and to check these new videos for identification against the video titles that are being tracked. For example, the new videos are the videos that have been posted on the monitored websites since the last crawl (e.g., the process 210) was performed for these monitored websites. In another example, the new videos are the videos that were posted on the monitored websites within a predetermined period of time, such as within the last 24 hours.

Specifically, at the process 210, one or more websites are crawled, and consequently one or more video links may be discovered. For example, these websites are predetermined to be monitored. In another example, the crawling is performed by a video crawler. In yet another example, the crawling can use more than one way to discover videos on one or more websites. According to one embodiment, the crawling can discover videos by traversing a website systematically using a depth-first algorithm and/or a width-first algorithm. According to another embodiment, the crawling can discover videos by searching a website with one or more keywords.

According to one embodiment, the process 210 includes a filtering process. At the filtering process, the discovered one or more video links are filtered based on their post times. For example, if a video link was not posted within a predetermined period of time, such as within the last 24 hours, this video link is discarded and hence not processed by the process 220.

At the process 220, the discovered video links are stored into a crawler database. For example, the crawler database is a crawler queue. In another example, the crawler queue operates on the first-in-first-out basis.

At the process 230, a video link is obtained from the crawler database. For example, the video link is obtained from the crawler database such as a crawler queue on the first-in-first-out basis. At the process 240, whether the obtained video link was already discovered is determined. For example, the obtained video link is compared with entries of a video link database such as entries of a video link index. According to one embodiment, if the obtained video link matches with at least one entry of the video link database, the obtained video link is determined to have been discovered before, and the process 230 is then performed. According to another embodiment, if the obtained video link does not match with any entry of the video link database, the obtained video link is determined not to have been discovered before, and the process 250 is then performed.

At the process 250, the video link database is updated. For example, the updated database includes the obtained video link. At the process 260, through the obtained video link, at least one video is downloaded. For example, the downloaded video is a video object. At the process 270, a video fingerprint for the downloaded video is determined. For example, the determination of the video fingerprint is performed according to U.S. patent application Ser. No. 11/681,567 and/or U.S. patent application Ser. No. 11/949,511.

At the process 280, whether the downloaded video matches with a tracked video title is determined by comparison of video fingerprints. For example, the downloaded video is a pirated version of the tracked video title, and thus matches with the tracked video title by comparison of video fingerprints. In another example, the downloaded video includes at least an episode of the tracked video title and thus matches with the tracked video title by comparison of video fingerprints. According to one embodiment, the process 280 is performed by querying a tracking master database and comparing the video fingerprint of the downloaded video with entries of tracking master database. For example, the tracking master database stores video fingerprints of tracked video titles.

According to one embodiment, if the downloaded video is determined not to match with any tracked video title, the process 230 is then performed. According to another embodiment, if the downloaded video is determined to match with a tracked video title, the process 290 is then performed.

At the process 290, a database for storing tracking results is updated. For example, the updated database stores information that indicates a video corresponding to a tracked video title has been newly discovered and identified. According to one embodiment, the stored information includes the identity of the host website from which the video has been discovered and identified. According to another embodiment, the stored information includes the link through which the video was downloaded at the process 260. According to yet another embodiment, the stored information includes certain statistics that have been downloaded from the host website regarding the video. For example, the downloaded statistics include the view count for the video.

At the process 292, the display of the tracking results has also been updated. For example, the tracking results are displayed on a front-end user interface, such as a Web interface. In another example, the updated display of the tracking results is shown in one or more of FIGS. 4-32.

At the process 294, whether there is any video link that has not yet been processed in the crawler database is determined.

For example, if one or more video links have not yet been processed in the crawler database, the process 230 is then performed. In another example, if there is no video link that has not yet been processed in the crawler database, the method 200 ends. In yet another example, if there is no video link that has not yet been processed in the crawler database, the process 294 is performed again immediately, is performed again after a predetermined period of time, or is performed periodically.

As discussed above and further emphasized here, FIG. 1 is merely an example, which should not unduly limit the scope of the claims. One of ordinary skill in the art would recognize many variations, alternatives, and modifications. For example, the process 292 is skipped. In another example, if, at the process 294, it is determined that there is no video link that has not yet been processed in the crawler database, the process 210 is then performed. In yet another example, the process 210 is performed repeatedly in a continuous manner or with a predetermined time interval.

Figure 2:
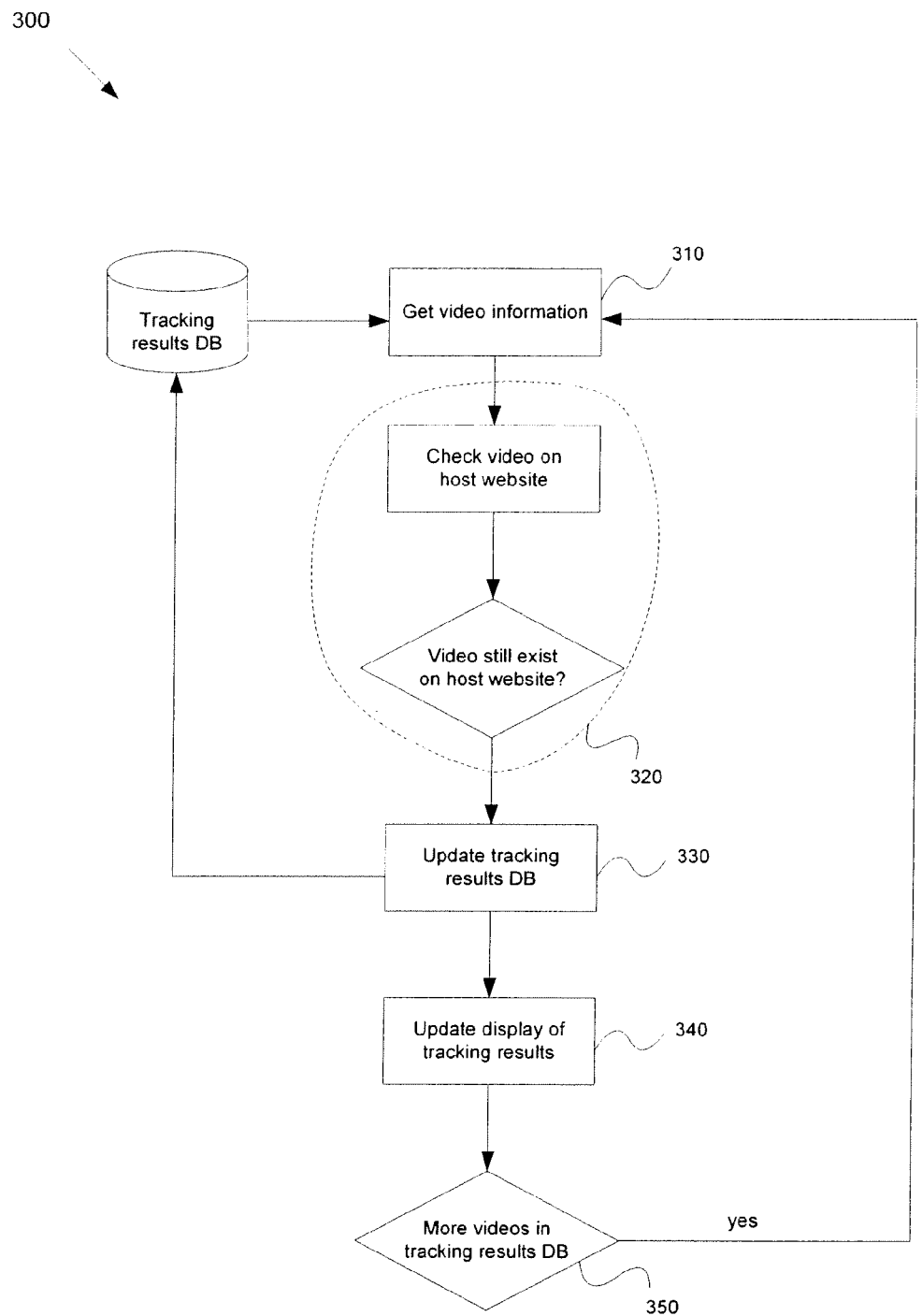
FIG. 2 is a simplified method for verifying previously identified videos according to an embodiment of the present invention.

FIG. 2 is a simplified method for verifying previously identified videos according to an embodiment of the present invention. This diagram is merely an example, which should not unduly limit the scope of the claims. One of ordinary skill in the art would recognize many variations, alternatives, and modifications. The method 300 includes process 310 for obtaining information about video from database of tracking results, process 320 for determining whether video still exists on host website, process 330 for updating database of tracking results, process 340 for updating display of tracking results, and process 350 for determining whether there is any video that has not yet been verified. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. As an example, some or all processes of the method are performed by a computer or a processor directed by a code. In another example, some or all processes of the method are performed according to instructions included by a computer-readable medium in a computer program product. In yet another example, the method 300 is performed automatically. Further details of these processes are found throughout the present specification.

At the process 310, information about a video is obtained from a database for storing tracking results. For example, the video is a video object. According to one embodiment, the video is not marked as having been removed from a host website from which the video was previously discovered and identified by the method 200. For example, the obtained information at the process 310 includes the identity of the host website. In another example, the obtained information includes the link through which the video was previously downloaded by the method 200.

At the process 320, whether the video still exists on the host website is determined. At the process 330, a database for storing tracking results is updated. According to one embodiment, if the video is determined to still exist on the host website, certain updated statistics about the video is downloaded from the host website and stored into the database for storing tracking results. For example, the updated statistics include the updated view count for the video. According to another embodiment, if the video is determined to no longer exist on the host website, the video is marked to indicate that this video has been removed from the host website.

At the process 340, the display of the tracking results has also been updated. For example, the tracking results are displayed on a front-end user interface, such as a Web interface. In another example, the updated display of the tracking results is shown in one or more of FIGS. 4-32. According to one embodiment, if the video is determined to still exist on the host website, the updated display shows certain updated statistics about the video. For example, the updated statistics include the updated view count for the video. According to another embodiment, if the video is determined to no longer exist on the host website, the updated display marks the video as having been removed from the host website.

At the process 350, whether there is any video that has not yet been verified in the database for storing tracking results is determined. According to one embodiment, if there is no video that has not yet been processed in the database, the method 300 ends. According to another embodiment, if there is no video that has not yet been processed in the database, the process 350 is performed again immediately, is performed again after a predetermined period of time, or is performed periodically.

According to another embodiment, if one or more videos have not yet been verified in the database, the process 310 is then performed. For example, information about another video is obtained from the database at the process 310. In another example, the another video was previously downloaded by the method 200 through a link that is different from the link(s) that correspond to the video(s) that have been verified. In yet another example, the another video and one or more of video(s) that have been verified may match with the same video title by comparison of video fingerprints.

As discussed above and further emphasized here, FIG. 2 is merely an example, which should not unduly limit the scope of the claims. One of ordinary skill in the art would recognize many variations, alternatives, and modifications. For example, the process 340 is skipped. In another example, if, at the process 350, it is determined that there is no video that has not yet been verified in the database, the method 300 is performed again to verify the videos that were newly discovered and identified by the method 200 or that were verified to still exist based on the immediately previous execution of the method 300. According to one embodiment, any video that has been marked as having been removed is not verified anymore. According to another embodiment, the subsequent execution of the method 300 is performed starting at a predetermined period of time after the completion of the previous execution of the method 300. In yet another example, the method 300 is performed repeatedly in a continuous manner or with a predetermined time interval. In yet another example, the process 310 is performed repeatedly in a continuous manner or with a predetermined time interval.

Figure 3:
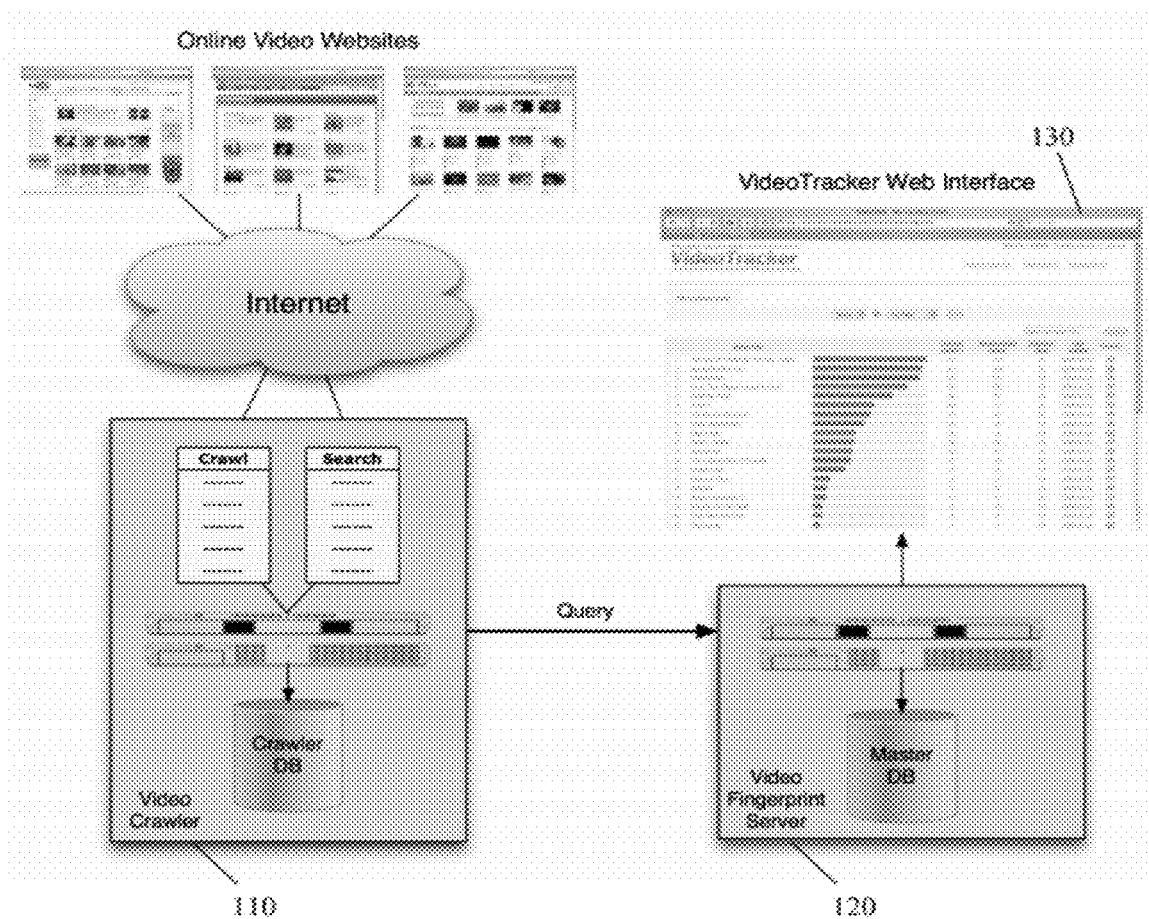
FIG. 3 is a simplified system implementing the method for discovering and identifying videos and/or the method for verifying previously identified videos according to certain embodiments of the present invention.

FIG. 3 is a simplified system implementing the method 200 for discovering and identifying videos and/or the method 300 for verifying previously identified videos according to certain embodiments of the present invention. This diagram is merely an example, which should not unduly limit the scope of the claims. One of ordinary skill in the art would recognize many variations, alternatives, and modifications. The system 100 includes a video crawler 110, a video fingerprint server 120, and a web interface 130. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

The video crawler 110 can crawl one or more websites to discover videos, build a video index for discovered videos, and download some or all of the discovered videos. For example, the video crawler can use more than one way to discover videos on one or more websites. According to one embodiment, the video crawler can discover videos by traversing a website systematically using a depth-first algorithm and/or a width-first algorithm. According to another embodiment, the video crawler can discover videos by searching a website with one or more keywords.

In another example, the video crawler includes at least a fingerprinting module. According to one embodiment, the fingerprinting module is implemented according to U.S. patent application Ser. No. 11/681,567 and/or U.S. patent application Ser. No. 11/949,511. According to another embodiment, the fingerprinting module can generate a fingerprint for a downloaded video, and query the fingerprint against a tracking master database through the video fingerprint server 120 in order to find a match between the downloaded video and a tracked video title. If a match is found, the identified downloaded video and its related information are presented on the Web interface 130 that can be accessed by a Web browser.

According to an embodiment, the methods 200 and 300 both use the system 100, and these two methods are performed in parallel. For example, the method 200 discovers new videos in websites that are being monitored, and check these new videos for identification against certain video titles that are being tracked. In another example, the method 300 verifies previously identified videos and updates tracking results. According to another embodiment, the method 200 and/or the method 300 is performed repeatedly in a continuous manner or in a periodic manner with predetermined time intervals.

FIGS. 4-32 are simplified diagrams showing display of tracking results according certain embodiments of the present invention. These diagrams are merely examples, which should not unduly limit the scope of the claims. One of ordinary skill in the art would recognize many variations, alternatives, and modifications.

Figure 4:
Figure 5:
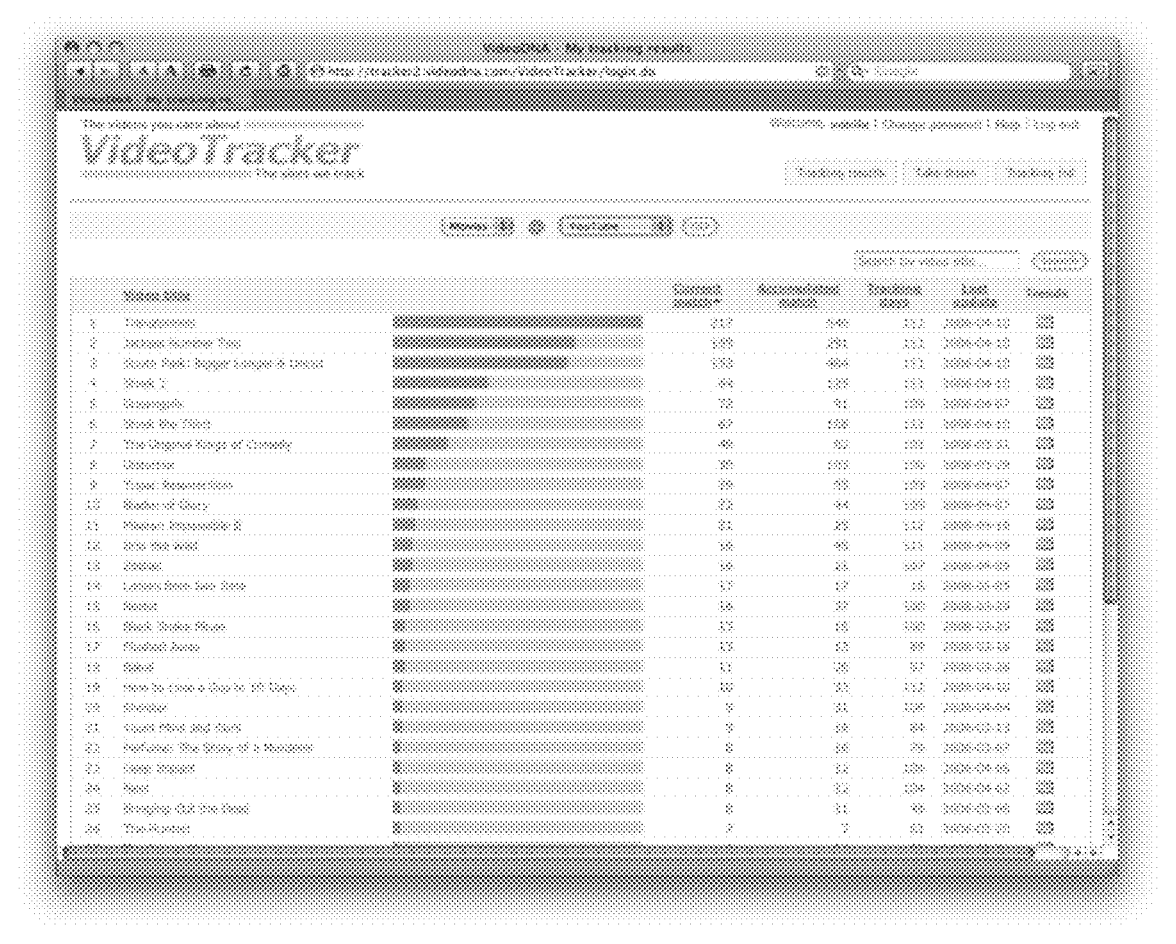
Figure 6:
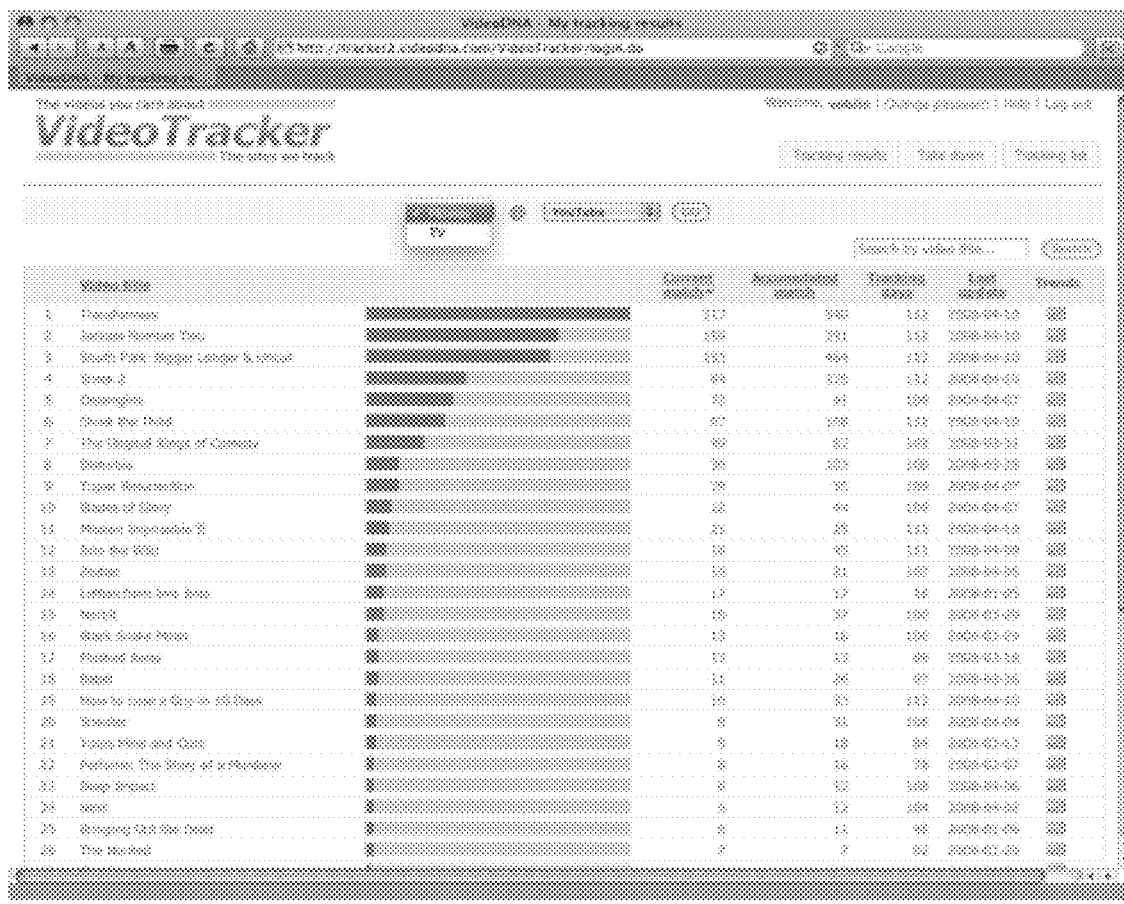
Figure 7:
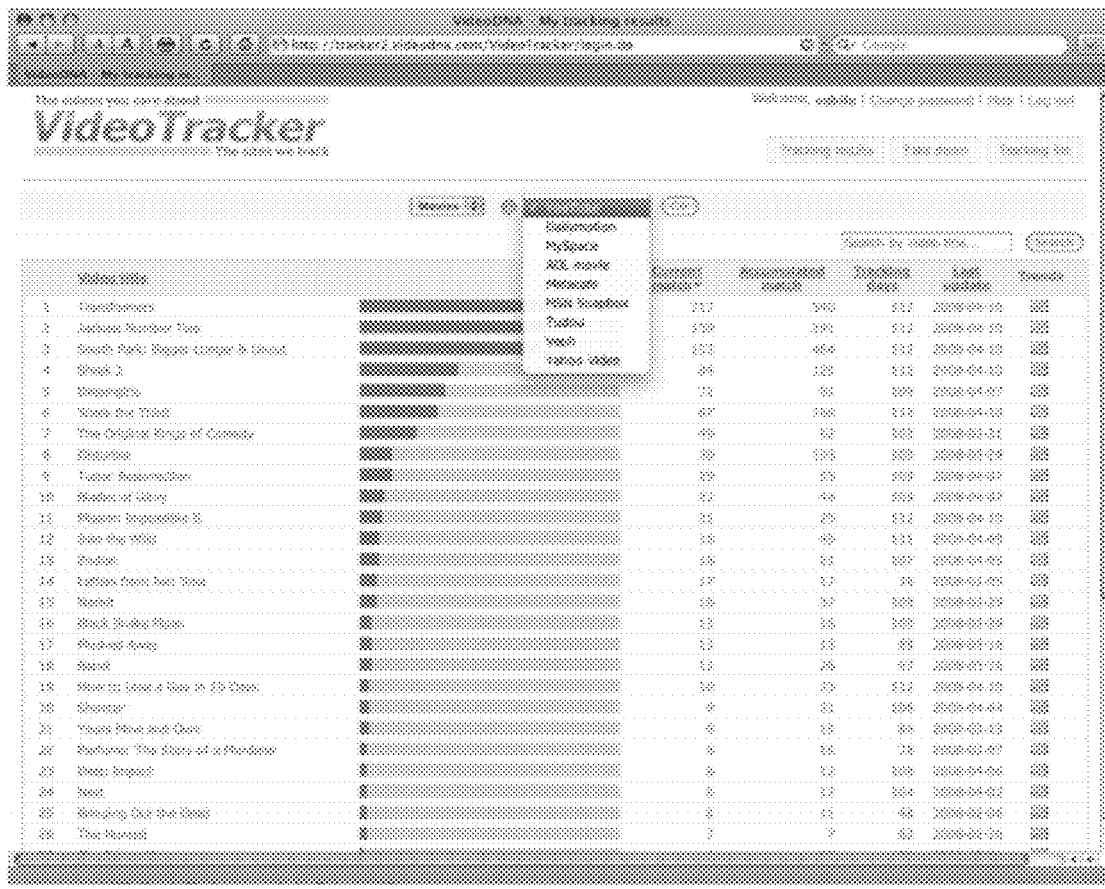
Figure 8:
Figure 9:
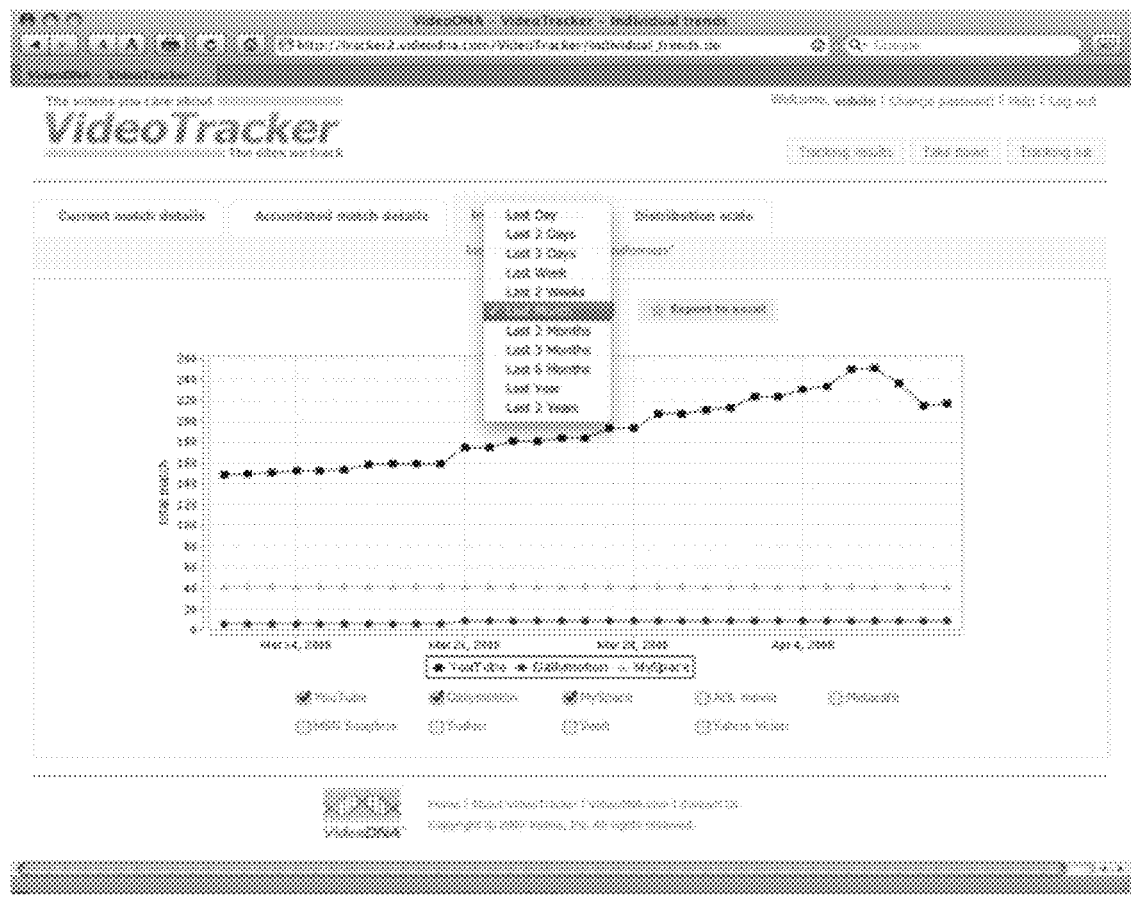
Figure 10:

Specifically, FIG. 4 shows a login page in a specific embodiment of user interface; FIG. 5 shows an overview of tracking results in a specific embodiment of user interface; FIG. 6 shows an overview of tracking results in different content categories in a specific embodiment of user interface; FIG. 7 shows an overview of tracking results for different tracking sites in a specific embodiment of user interface; FIG. 8 shows certain trends of daily matches on one site for a tracked title in a time range according to a specific embodiment of user interface; FIG. 9 shows certain trends of daily matches on multiple sites for a tracked title in a time range according to a specific embodiment of user interface; FIG. 10 shows a distribution of total matches among multiple sites for a tracked title in a time range according to a specific embodiment of user interface.

Figure 11:
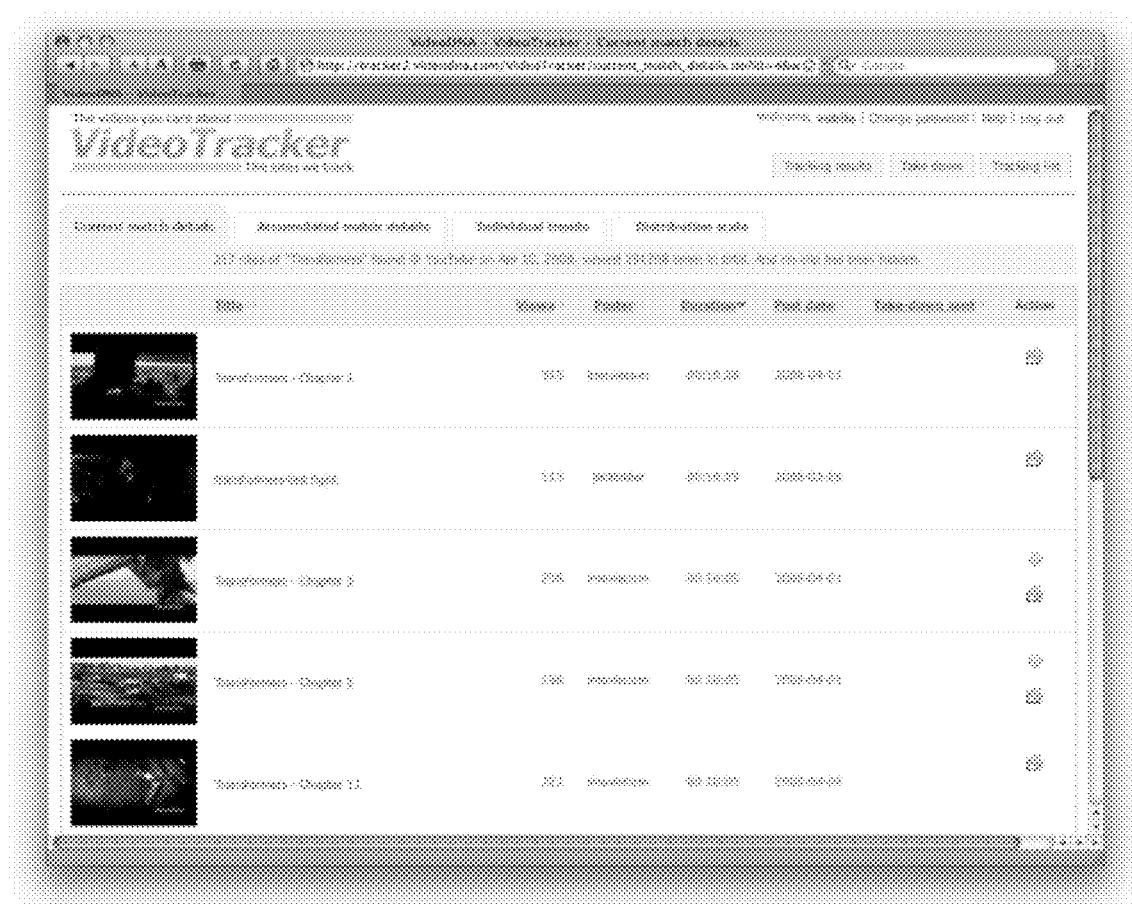
Figure 12:
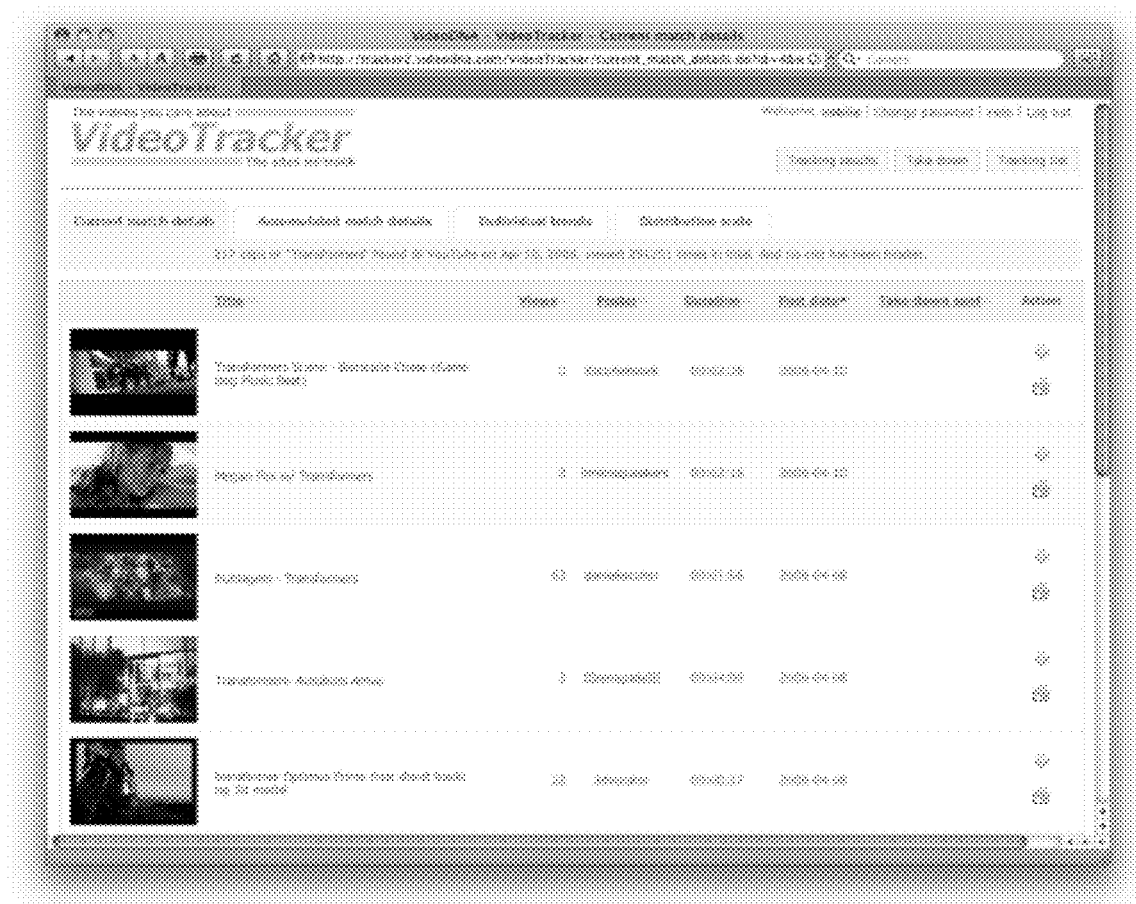
Figure 13:
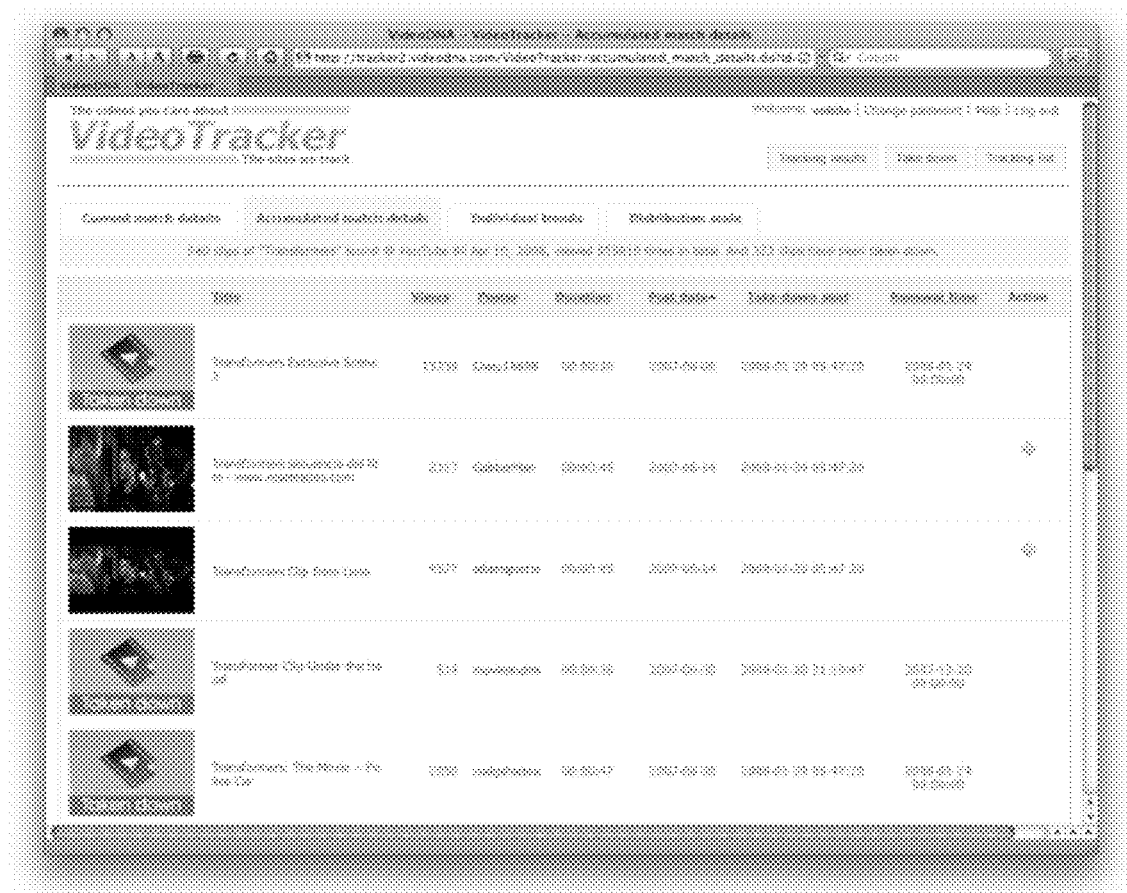
Figure 14:
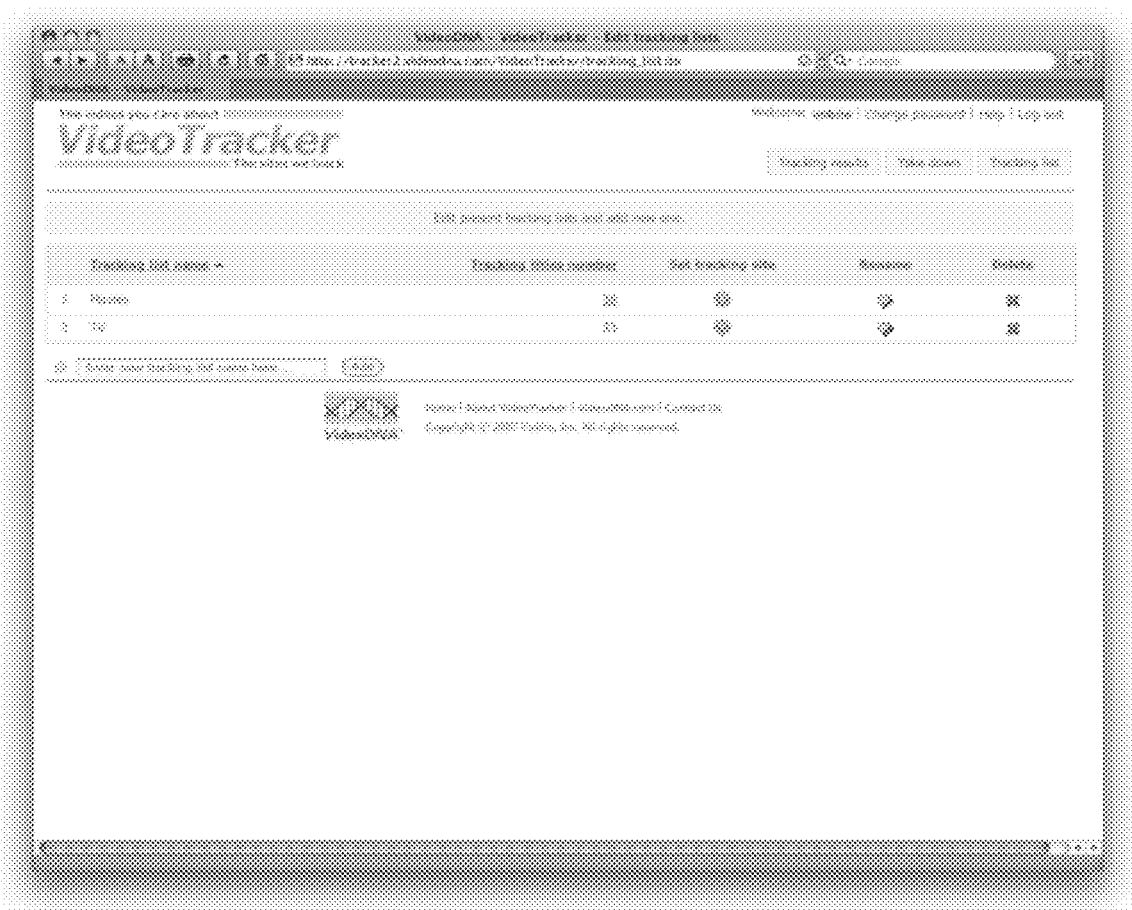
Figure 15:
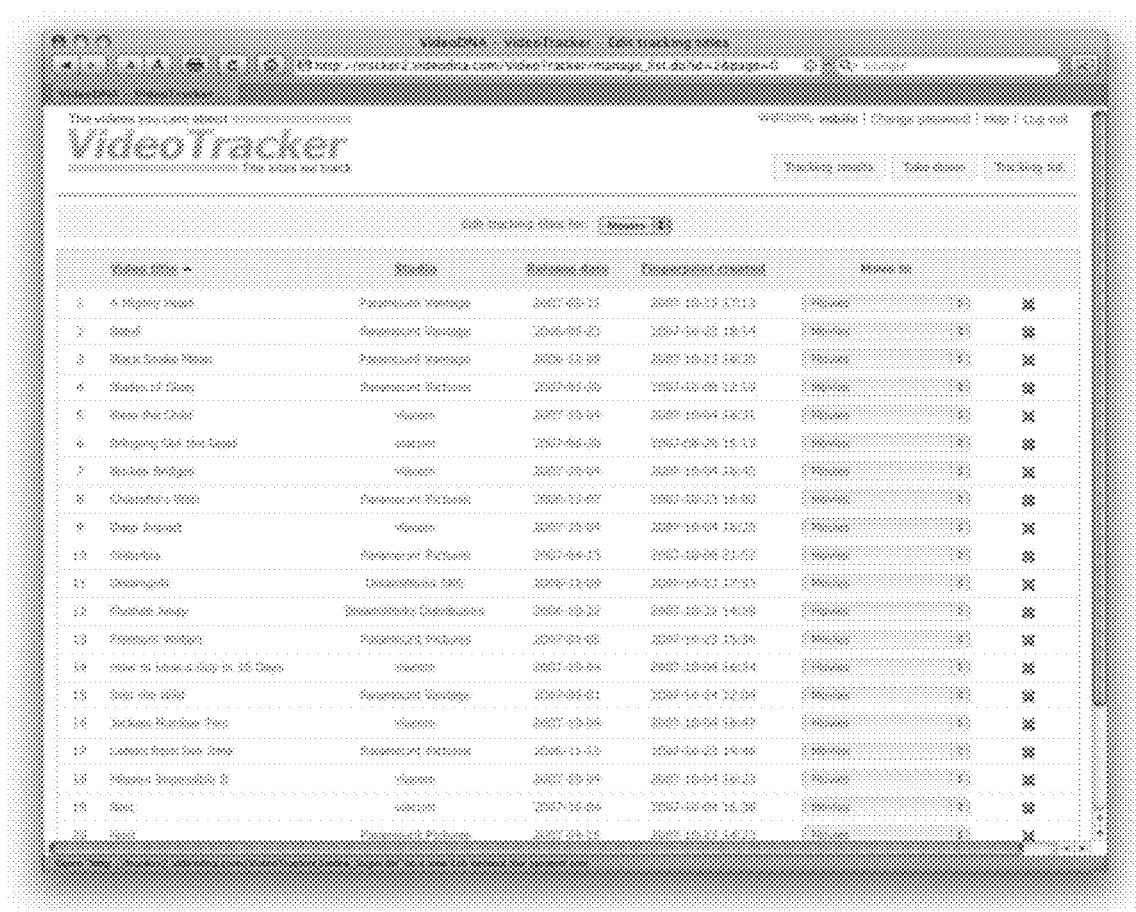
Figure 16:
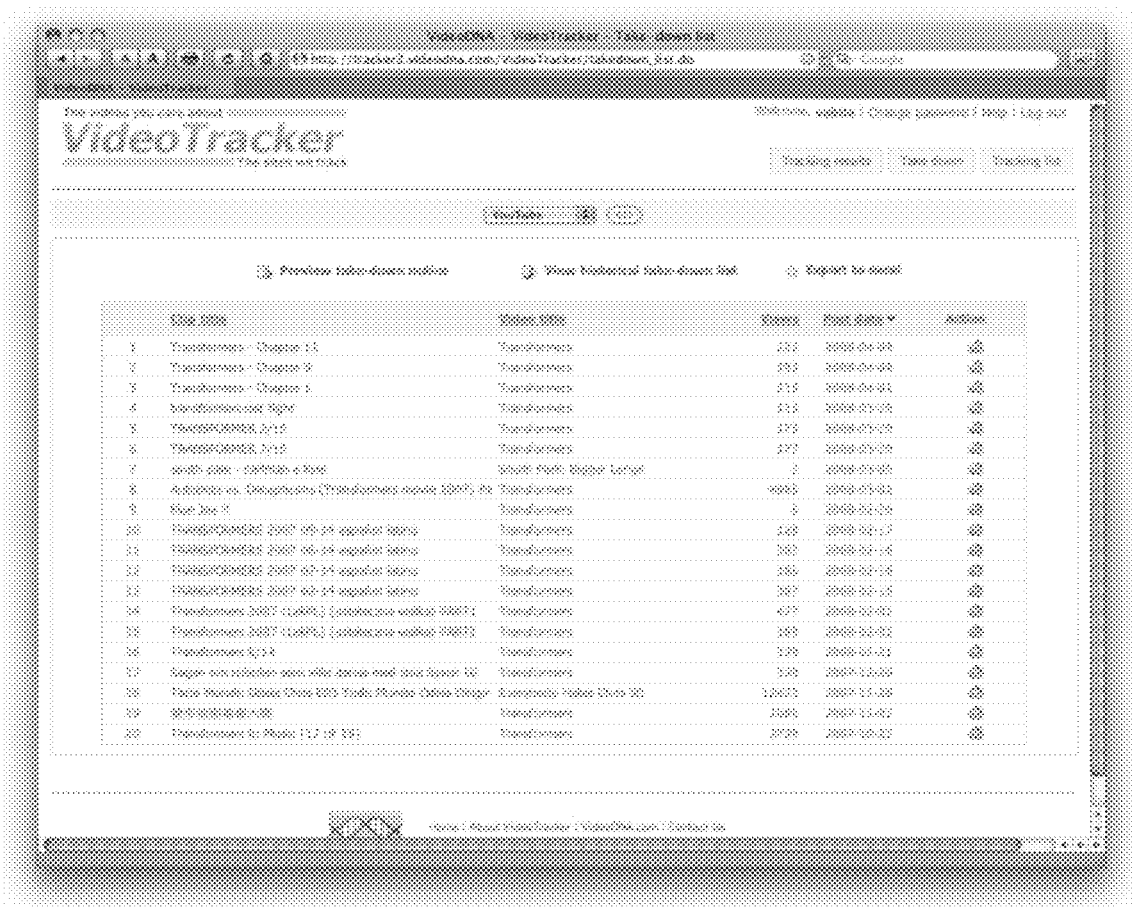
Figure 17:
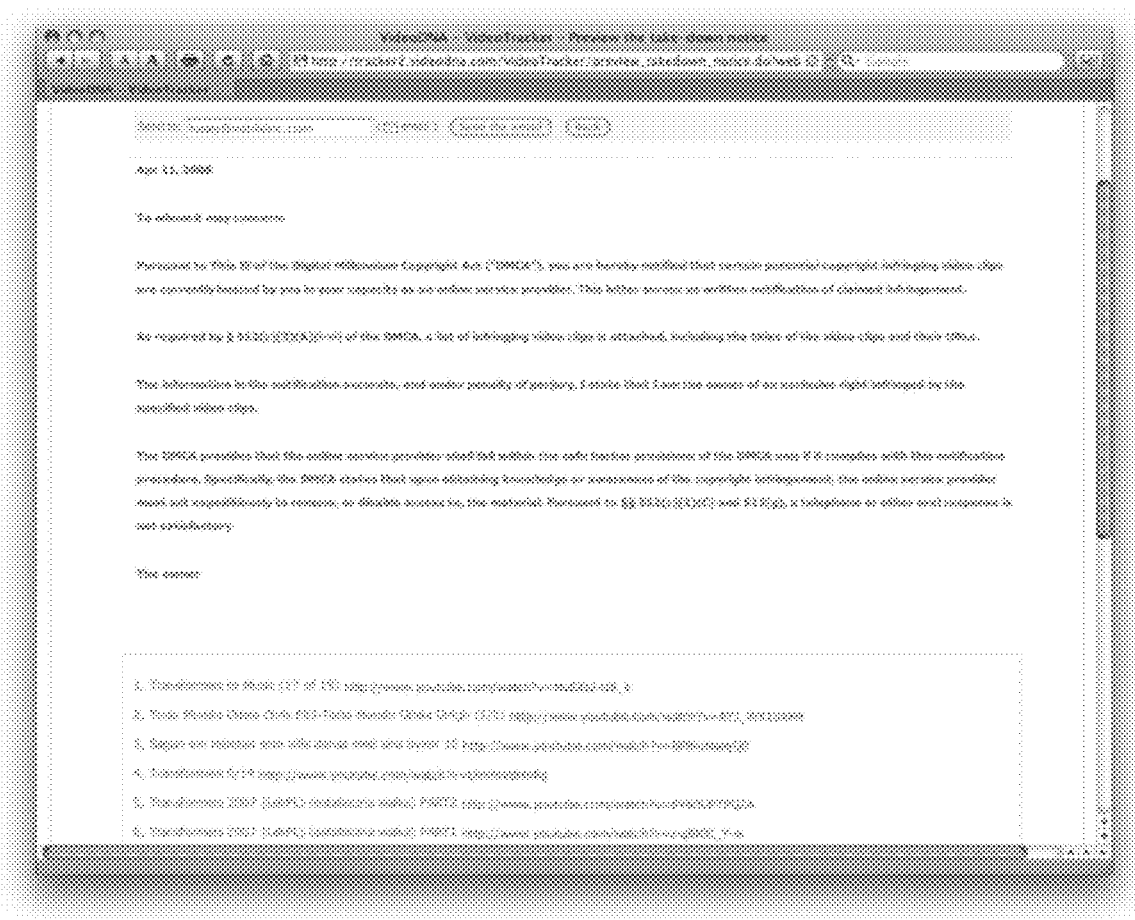

FIG. 11 shows a display of detailed match results sorted by time duration in a specific embodiment of user interface; FIG. 12 shows a display of detailed match results sorted by post dates in a specific embodiment of user interface; FIG. 13 shows a display of detailed match results showing clips that have been removed from a host website in a specific embodiment of user interface; FIG. 14 shows an interface for managing track lists in a specific embodiment of user interface; FIG. 15 shows an interface for managing titles in a track list according to a specific embodiment of user interface; FIG. 16 shows an interface for preparing a take-down list in a specific embodiment of user interface; and FIG. 17 shows an interface for preparing a take-down notice in a specific embodiment of user interface.

Figure 18:
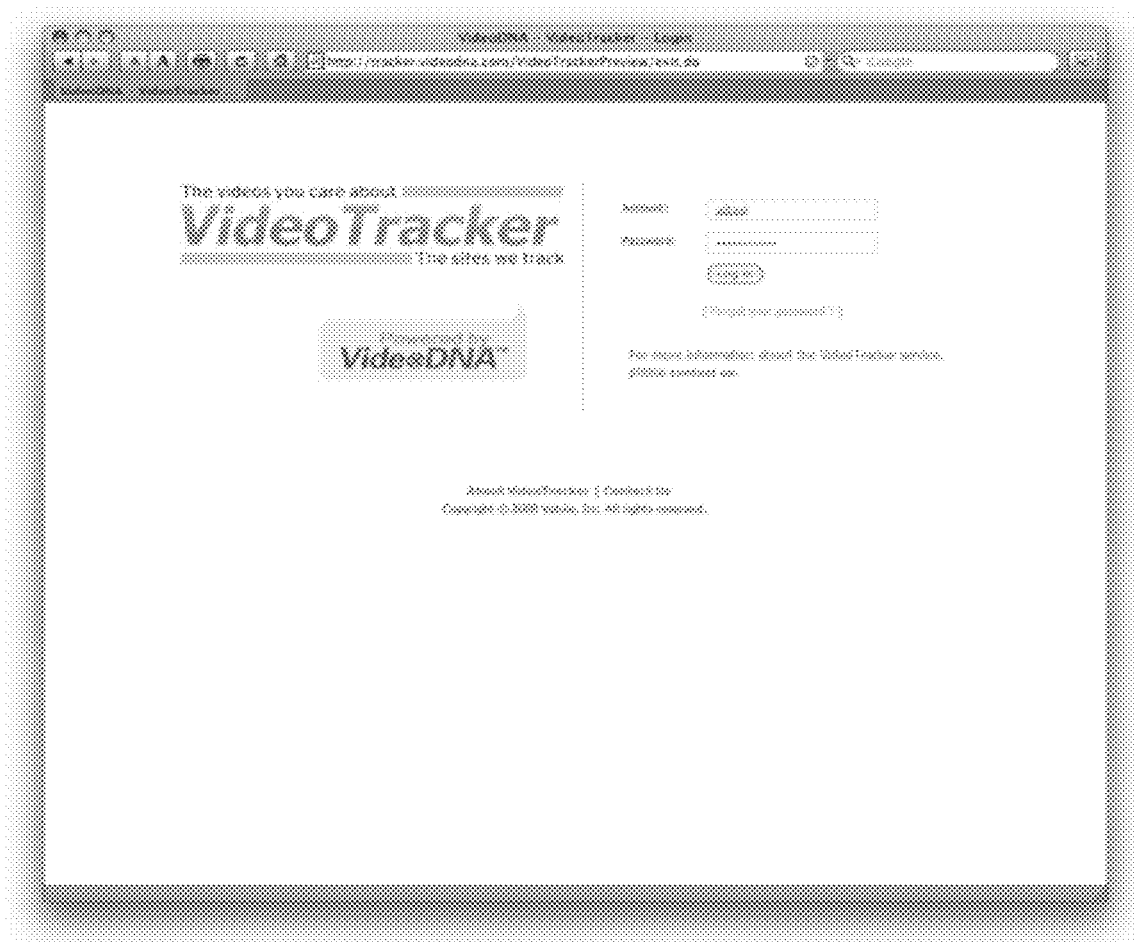
FIGS. 18-32 are simplified diagrams showing display of tracking results according to some embodiments of the present invention.
Figure 19:
Figure 20:
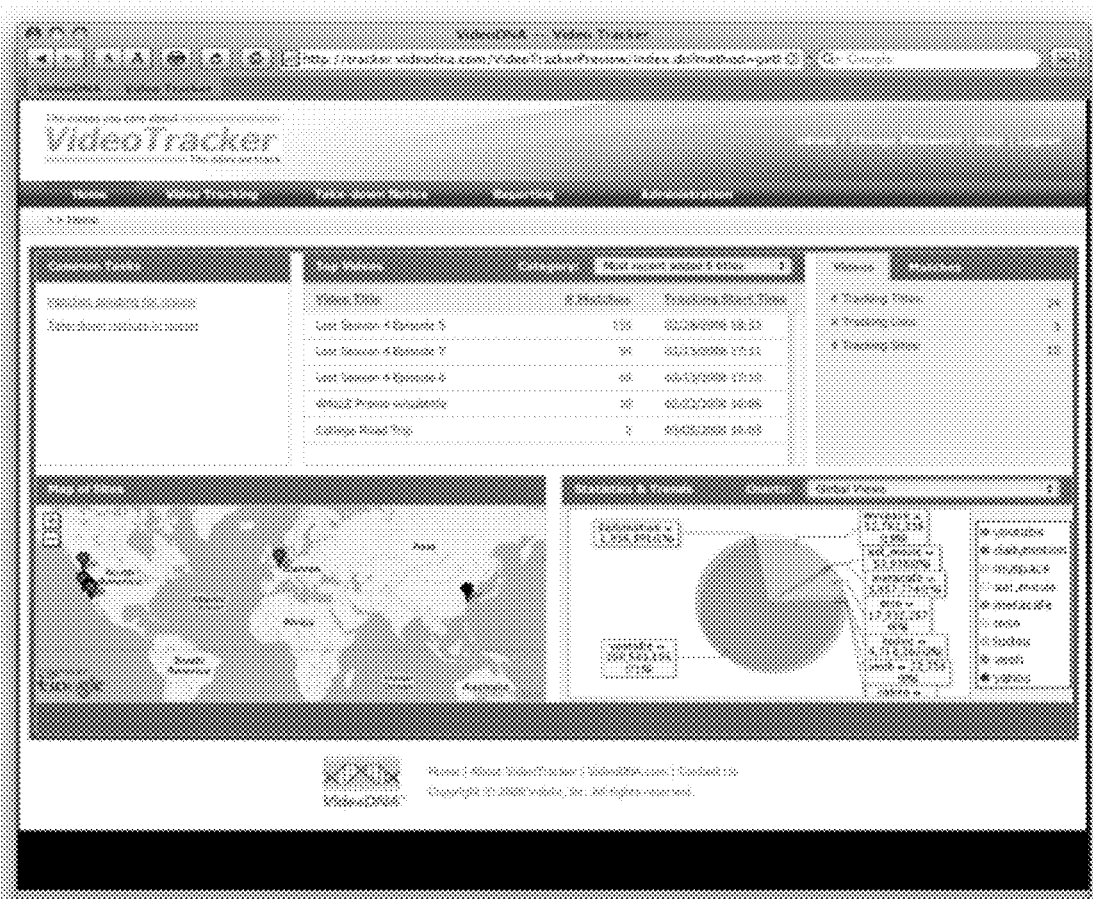
Figure 21:
Figure 22:
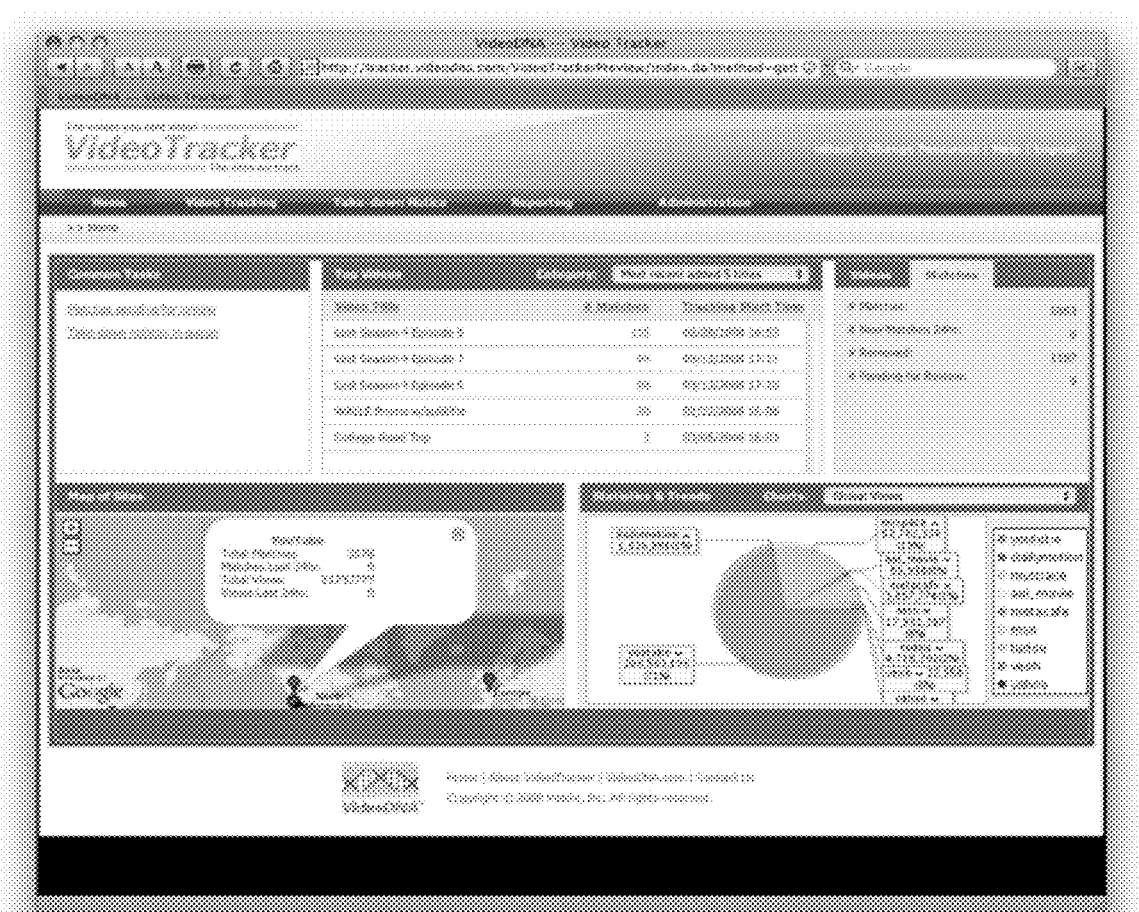

According to another embodiment, FIG. 18 shows a login page of user interface for presentation of the tracking results; FIG. 19 shows a dashboard that provides summary information such as total number of titles and sites being tracked according to another specific embodiment of user interface; FIG. 20 shows a dashboard that provides summary information such as aggregate number of views in another specific embodiment of user interface; FIG. 21 shows a dashboard that provides summary information including total number of matches, total number of new matches, and total number of removals in another specific embodiment of user interface; FIG. 22 shows a dashboard that provides summary information and a zoomed view of site statistics in the vicinity of a mouse pointer according to another specific embodiment of user interface.

Figure 23:
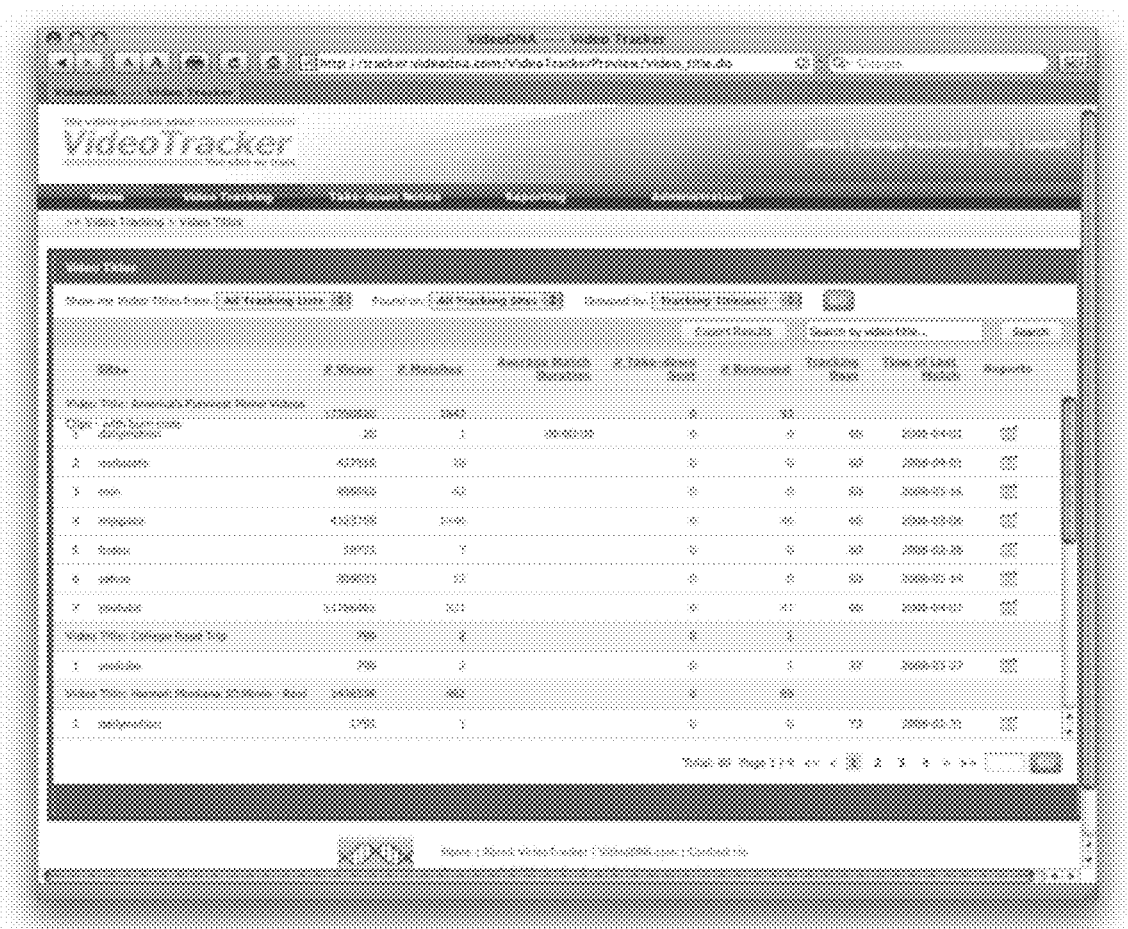
Figure 24:
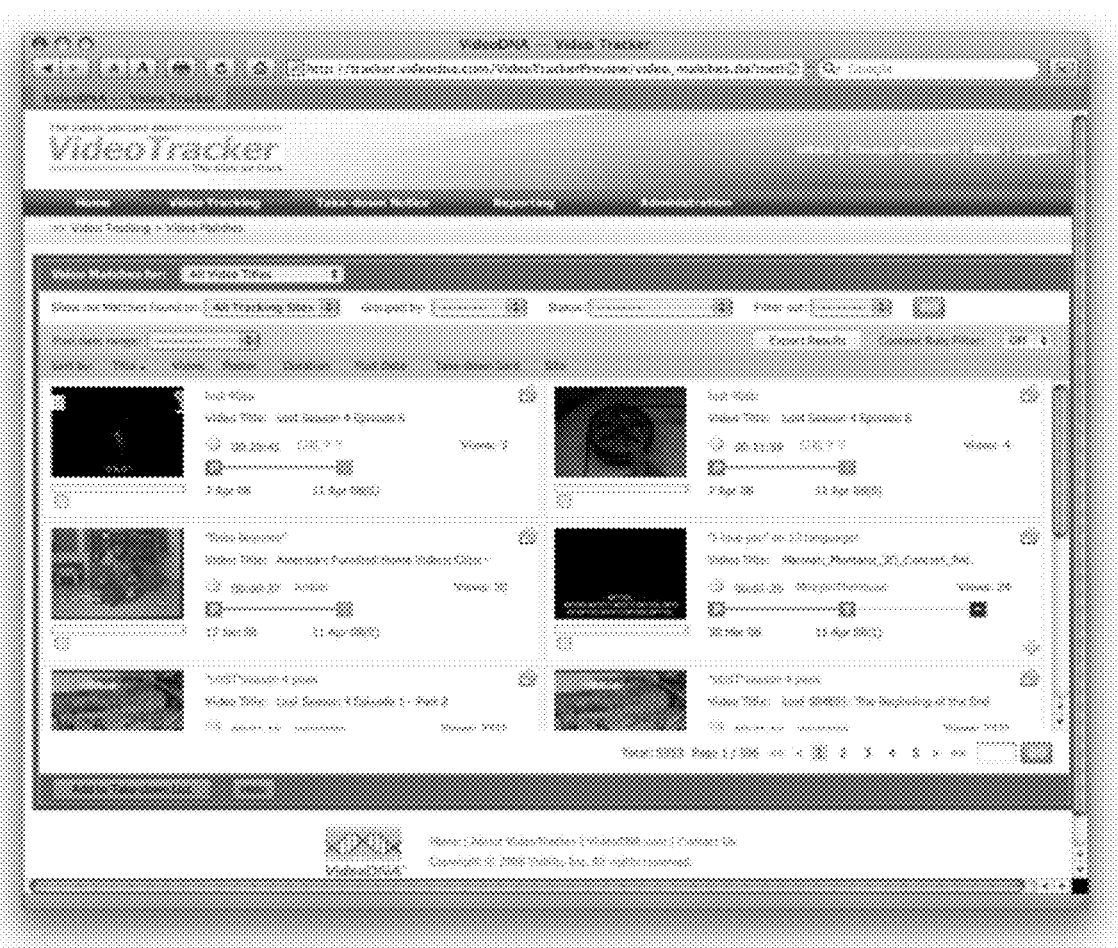
Figure 25:
Figure 26:
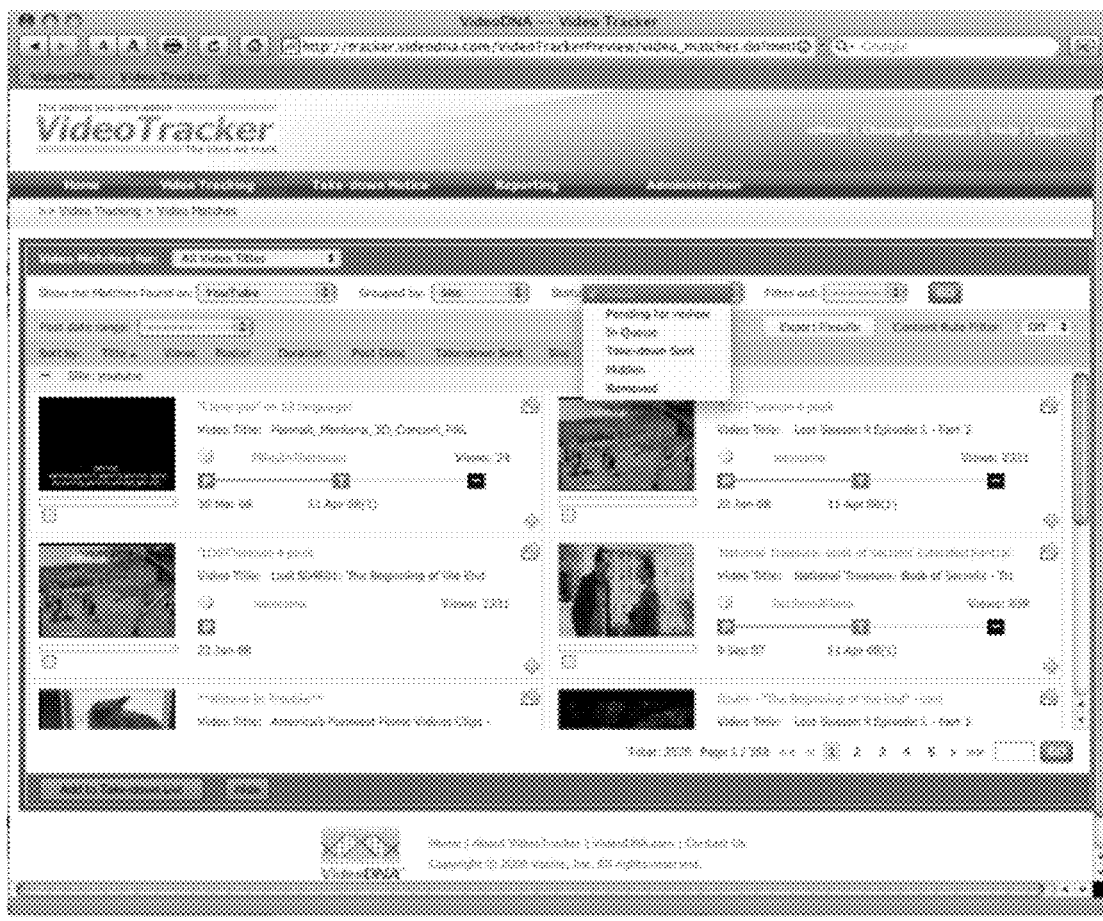
Figure 27:
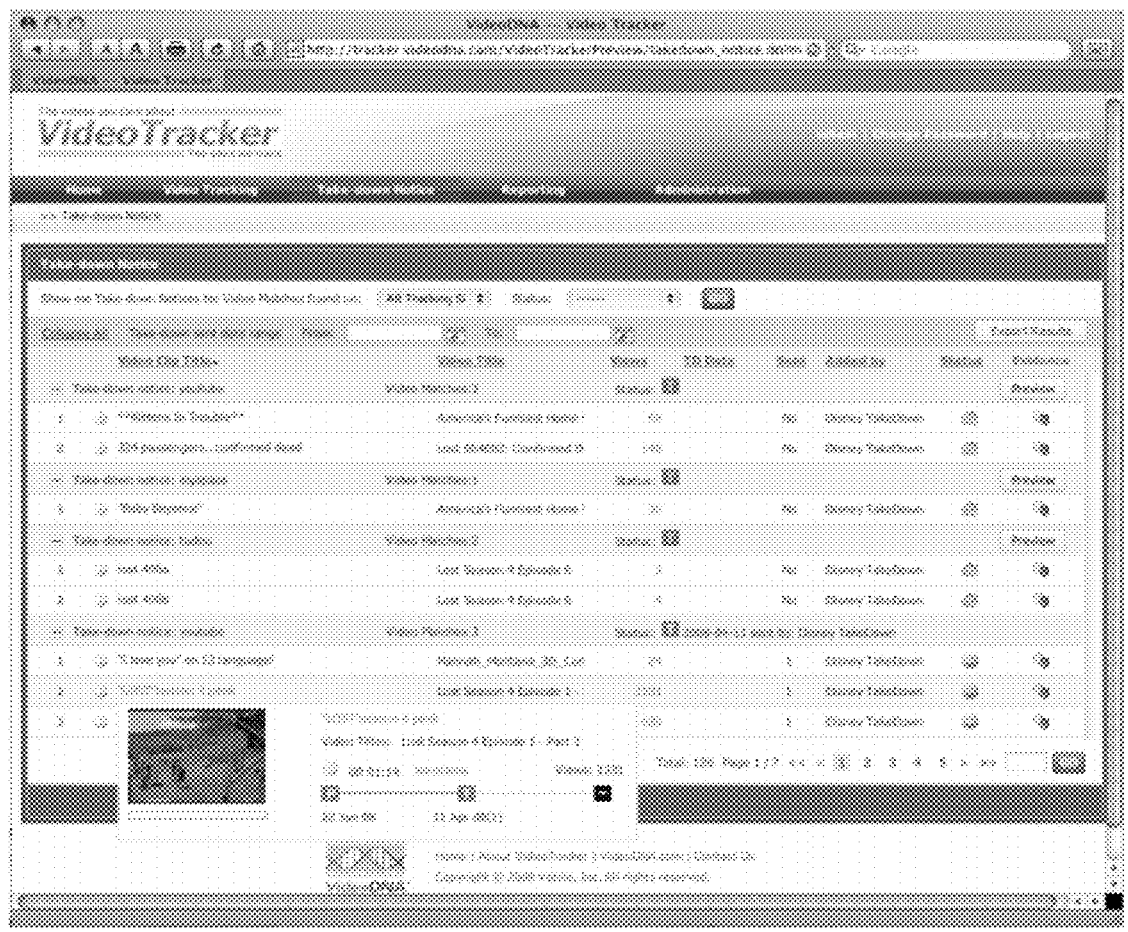
Figure 28:
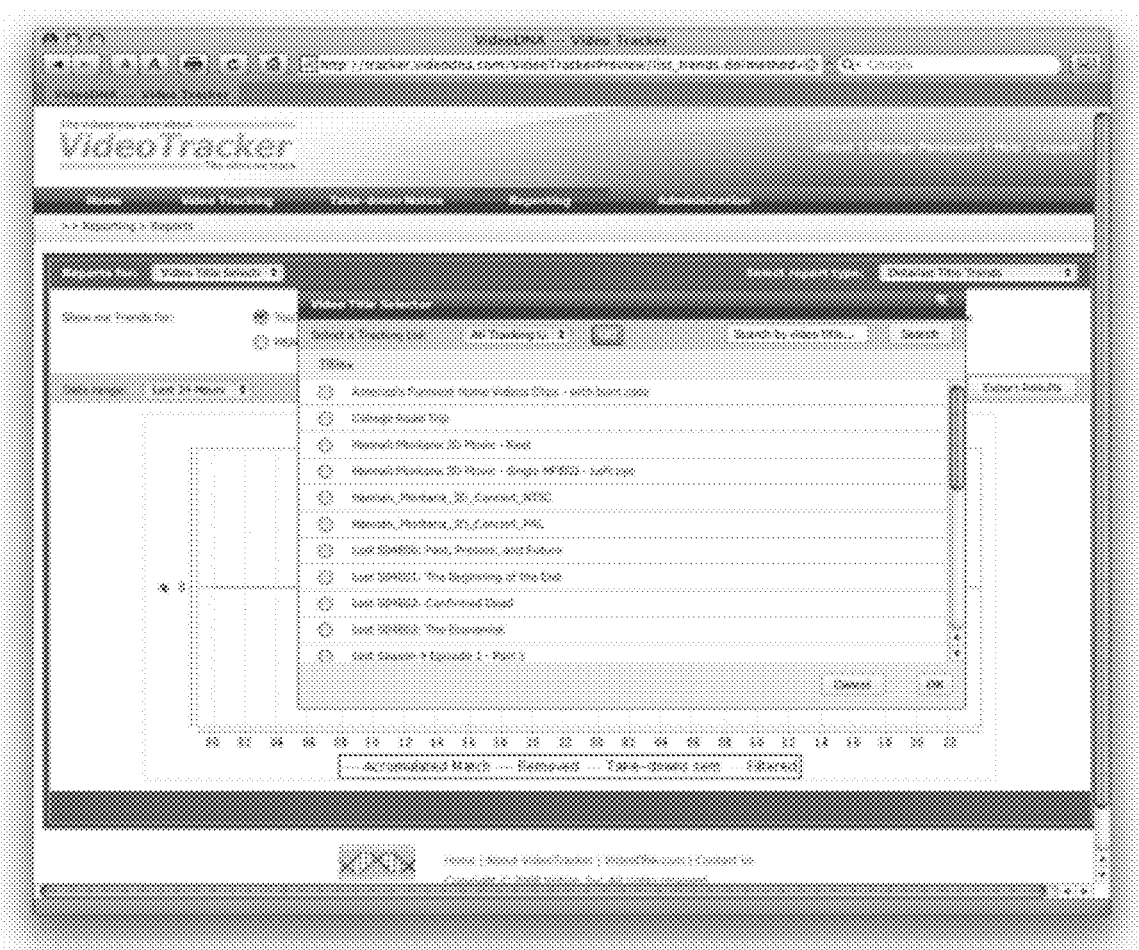
Figure 29:
Figure 30:
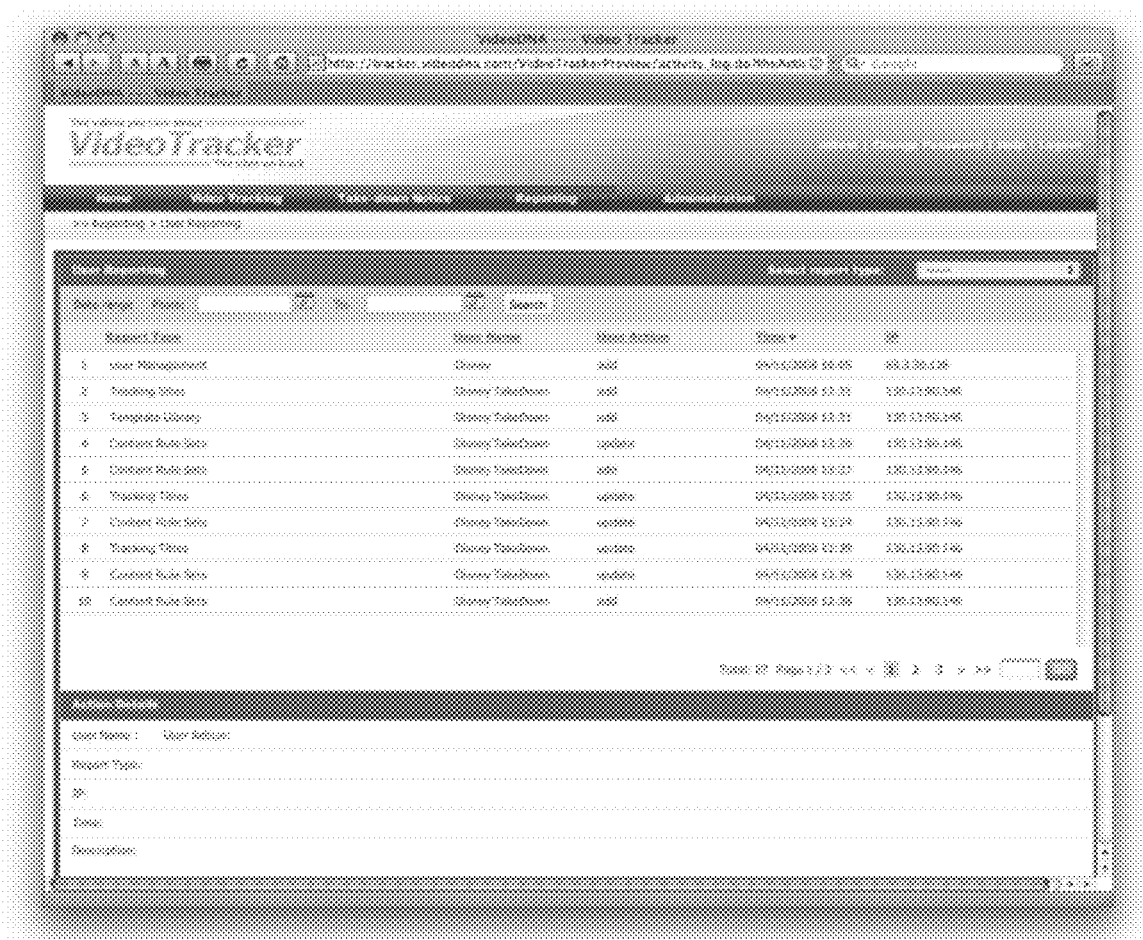
Figure 31:
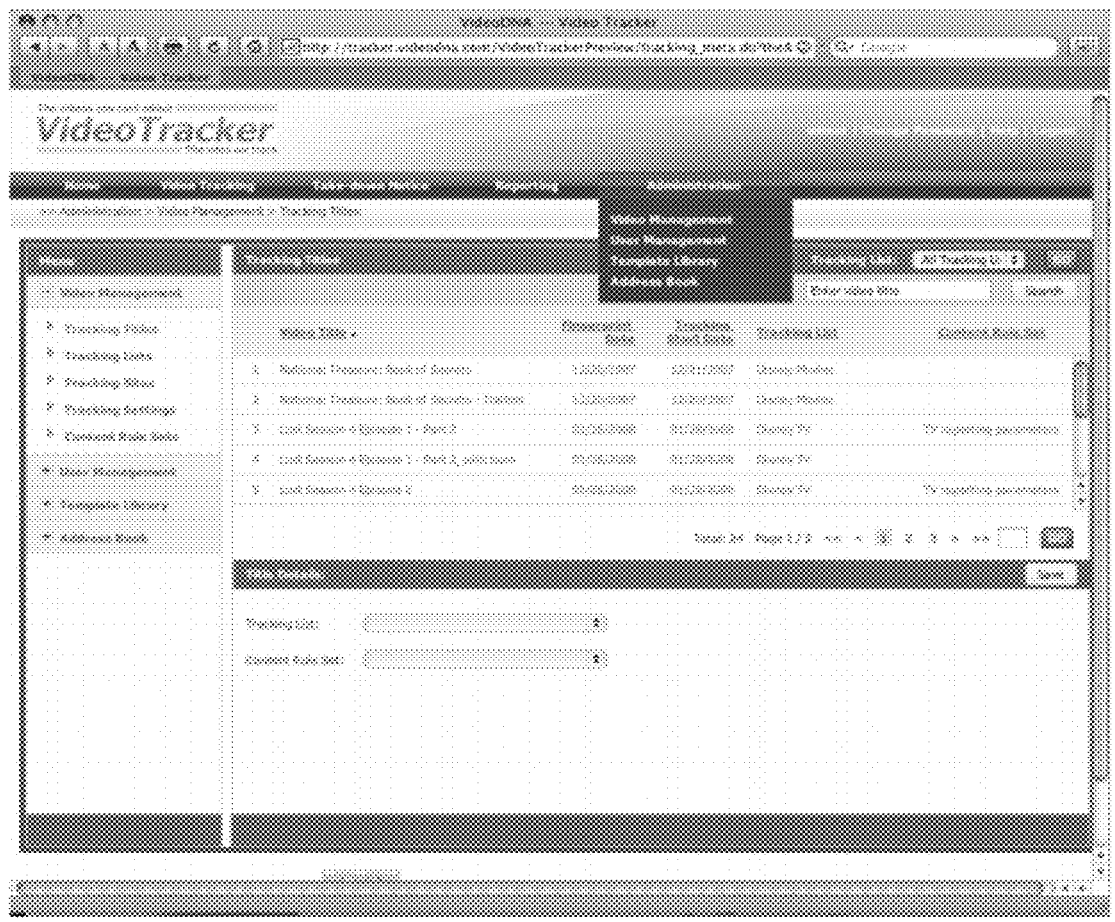

FIG. 23 shows a summary report of view statistics grouped by video titles being tracked in another specific embodiment of user interface; FIG. 24 shows a detailed view of matches that provides status of each matched clip in another specific embodiment of user interface; FIG. 25 shows a customized view of matches found on a host website according to another specific embodiment of user interface; FIG. 26 shows a customized view of matches in a specific status according to another specific embodiment of user interface; FIG. 27 shows a page for preparing and reviewing take-down notices in another specific embodiment of user interface; FIG. 28 shows a page for selecting one or more titles for creating a trend report according to another specific embodiment of user interface; FIG. 29 shows a page that presents trends in various tracked activities according to another specific embodiment of user interface; FIG. 30 shows a page for reporting user activities according to another specific embodiment of user interface; and FIG. 31 shows a page for performing various administration tasks related to tracking according to another specific embodiment of user interface.

Figure 32:
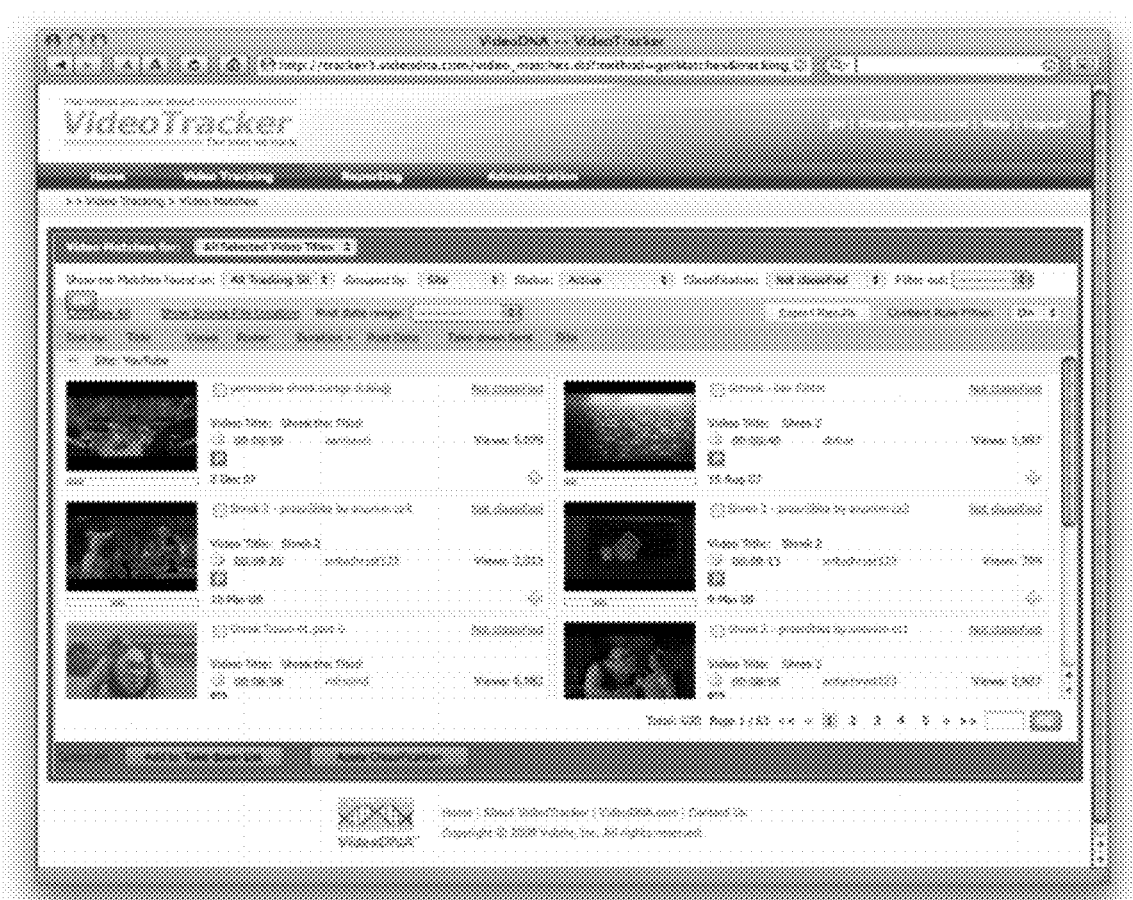

Also, FIG. 32 shows detailed information about matched clips where the match offset and duration of a matched clip is overlaid on the timeline of a master video title that is being tracked to show exactly which portion of the master video title that a clip is matched to.

As discussed above, certain embodiments of the present invention use a Web interface to present and update tracking results dynamically and continuously as new identifications are made according to the method 200 and previous identifications are verified and updated according to the method 300.

According to one embodiment, a user comes to a web page to log in (e.g., FIG. 4). After the user has logged in, a summary page is presented about a list of titles being tracked (e.g., FIG. 5). The user may select a different list of titles (e.g., FIG. 6) and/or select a different website (e.g., FIG. 7) to customize the view of summary tracking results.

For example, the user can view detailed tracking results by clicking on a trend plot (e.g., FIG. 8) that displays daily or hourly occurrence of identified videos against a master title being tracked on a website being monitored. The view of the trend plot can be customized to show a different range of time (e.g., FIG. 9) and/or overlay of trend plots corresponding to multiple websites. The distribution of occurrence of identified videos among multiple websites can also be shown for a master title being tracked (e.g., FIG. 10).

In another example, the user can view more detailed tracking results by clicking on a dot representing one day on the trend plot to open a new web page (e.g., FIG. 11) that shows the detailed information about the videos that are identified against a master title being tracked. The detailed view of identified videos can be customized. For example, the identified videos can be sorted by the length of the videos (e.g., FIG. 11), or by postdate of the videos on the website (e.g., FIG. 12). When showing identified videos on a past date, videos that no longer exist on the current date are marked as "taken down" and their removal dates are shown (e.g., FIG. 13).

In yet another example, the Web interface is also designed and implemented to customize the tracking process. For example, the user can add and modify track lists that are composed of various titles to be tracked across one or more websites (e.g., FIGS. 14 and 15). Additionally, the user can export and organize the tracking results for different applications. For example, if the user who is the owner of the video content believes the identified videos are posted on the host website without authorization, the user can compile a "takedown" list and prepare a "take-down" notice (e.g., FIGS. 16 and 17) that is to be sent to the hosting site.

According to another embodiment, a user comes to a web page to log in (e.g., FIG. 18), and is presented with a dashboard after login (e.g., FIG. 19). For example, the dashboard highlights some important tracking data, such as the total number of titles being tracked and sites being monitored, and the matches found for recently added tracking titles. In another example, the dashboard also shows the sites being monitored across the world in a map, and the distribution of matches across all sites in a pie chart.

There are many ways to customize the views on the dashboard. For example, in the "Statistics & Trends" portion, the user can customize the pie chart to show distribution of the total number of views across all sites being monitored (e.g., FIG. 20). In another example, the user can choose to show summary information about found matches (e.g., FIG. 21). In yet another example, the user can zoom in on the map and moves cursor to a site to display summary tracking data about the site (e.g., FIG. 22).

According to one embodiment, the dashboard also facilitates navigation to other web pages that provide additional information or functionality. When the user clicks on the "Video Tracking" button from the dashboard, a new page opens and displays detailed tracking data about titles being tracked across the sites being monitored (e.g., FIG. 23). There are many ways to customize the view of the "Video Tracking" page. For example, tracking results can be grouped by titles being tracked (e.g., FIG. 23) or by matches to the tracking titles on the sites being monitored (e.g., FIG. 24). Furthermore, the tracking results can be filtered by various criteria to show results on a specific site (e.g., FIG. 25) or in a special status (e.g., FIG. 26).

According to another embodiment, detailed information about a matched clip can be displayed. For example, the match offset and duration of a matched clip can be overlaid on the master video's timeline to show exactly which portion of the master video that the clip is matched to (e.g., FIG. 32). According to yet another embodiment, when the user clicks on the "Takedown Notices" button from the dashboard, a new page opens for reviewing the take-down notices that have been prepared and/or sent to sites where unauthorized postings that match the tracked titles have been found (e.g., FIG. 27).

According to yet another embodiment, when the user goes to the "Reporting" page from the dashboard, the user can generate a report in various ways. For example, user can create a trend plot showing the matches to one or more tracking titles in a specific time range (e.g., FIGS. 28 and 29). In another example, an account manager can generate a report about all user activities in the account (e.g., FIG. 30).

According to yet another embodiment, an authorized user ("admin") can also go to the "Administration" page from the dashboard to perform a number of administration tasks for an account (e.g., FIG. 31). For example, the admin can create or update a track list, add or remove titles to a track list, and add or remove tracked sites under "Video Management". The admin can also add or remove users, and manage the privileges of the users under "User Management".

According to another embodiment, a method for discovering and identifying a video object includes crawling at least one predetermined website, discovering at least one video link at the predetermined website, processing information associated with a first database for storing one or more video links, and determining whether the discovered video link was already discovered before based on at least information associated with the first database. Additionally, the method includes, if the discovered video link is determined not to have been discovered before, updating the first database based on at least information associated with the discovered video link, downloading at least one video object based on at least information associated with the discovered video link, and processing information associated with the downloaded video object. Moreover, the method includes, if the discovered video link is determined not to have been discovered before, determining a first fingerprint for the downloaded video object based on at least information associated with the downloaded video object, processing information associated with at least the first fingerprint for the downloaded video object, determining whether the downloaded video object matches with a video title that is being tracked based on at least information associated with the first fingerprint and a second fingerprint, and if the downloaded video object is determined to match with the video title that is being tracked, updating a second database for storing one or more tracking results. The second fingerprint corresponds to the video title. For example, the method is implemented according to FIG. 1.

According to another embodiment, a computer program product including a computer readable medium including instructions for discovering and identifying a video object. The computer readable medium includes one or more instructions for crawling at least one predetermined website, one or more instructions for discovering at least one video link at the predetermined website, one or more instructions for processing information associated with a first database for storing one or more video links, and one or more instructions for determining whether the discovered video link was already discovered before based on at least information associated with the first database. Additionally, the computer readable medium includes one or more instructions for, if the discovered video link is determined not to have been discovered before, updating the first database based on at least information associated with the discovered video link, downloading at least one video object based on at least information associated with the discovered video link, processing information associated with the downloaded video object, determining a first fingerprint for the downloaded video object based on at least information associated with the downloaded video object, processing information associated with at least the first fingerprint for the downloaded video object, determining whether the downloaded video object matches with a video title that is being tracked based on at least information associated with the first fingerprint and a second fingerprint, and if the downloaded video object is determined to match with the video title that is being tracked, updating a second database for storing one or more tracking results. The second fingerprint corresponds to the video title. For example, the computer program product is implemented according to FIGS. 1 and/or 3.

According to yet another embodiment, a method for verifying a video object includes obtaining information associated with a video object from a database for storing one or more tracking results. The obtained information is associated with at least one host website for the video object. Additionally, the method includes verifying whether the video object still exists on the host website based on at least information associated with the at least one host website for the video object. Moreover, the method includes, if the video object is verified to still exist on the host website, downloading updated information associated with the video object from the host website and storing the updated information associated with the video object to the database. Also, the method includes, if the video object is verified to no longer exist on the host website, marking the video object as having been removed from the host website. Additionally, the method includes updating a display of the one or more tracking results. For example, the method is implemented according to FIG. 2.

According to yet another embodiment, a computer program product including a computer readable medium including instructions for verifying a video object. The computer readable medium includes one or more instructions for obtaining information associated with a video object from a database for storing one or more tracking results, the obtained information being associated with at least one host website for the video object, and one or more instructions for verifying whether the video object still exists on the host website based on at least information associated with the at least one host website for the video object. Additionally, the computer readable medium includes one or more instructions for, if the video object is verified to still exist on the host website, downloading updated information associated with the video object from the host website and storing the updated information associated with the video object to the database. Moreover, the computer readable medium includes one or more instructions for, if the video object is verified to no longer exist on the host website, marking the video object as having been removed from the host website. Additionally, the computer readable medium includes one or more instructions for updating a display of the one or more tracking results. For example, the computer program product is implemented according to FIGS. 2 and/or 3.

According to yet another embodiment, a method for identifying and verifying a video object includes crawling at least one predetermined website, discovering at least one video link at the predetermined website, processing information associated with a first database for storing one or more video links, and updating the first database based on at least information associated with the discovered video link. Additionally, the method includes downloading at least one video object based on at least information associated with the discovered video link, processing information associated with the downloaded video object, and determining a first fingerprint for the downloaded video object based on at least information associated with the downloaded video object. Moreover, the method includes processing information associated with at least the first fingerprint for the downloaded video object, determining a match between the downloaded video object and a video title that is being tracked based on at least information associated with the first fingerprint and a second fingerprint, updating a second database for storing one or more tracking results, and obtaining information associated with the video object from the second database. The second fingerprint corresponds to the video title, and the obtained information is associated with at least the predetermined website. Also, the method includes verifying whether the video object still exists on the predetermined website based on at least information associated with the predetermined website. Additionally, the method includes, if the video object is verified to still exist on the predetermined website, downloading updated information associated with the video object from the predetermined website, and storing the updated information associated with the video object to the second database. Moreover, the method includes, if the video object is verified to no longer exist on the predetermined website, marking the video object as having been removed from the predetermined website. Also, the method includes updating a display of the one or more tracking results. For example, the method is implemented according to FIGS. 1 and/or 2.

According to yet another embodiment, a computer program product including a computer readable medium including instructions for identifying and verifying a video object. The computer readable medium includes one or more instructions for crawling at least one predetermined website, one or more instructions for discovering at least one video link at the predetermined website, one or more instructions for processing information associated with a first database for storing one or more video links, and one or more instructions for updating the first database based on at least information associated with the discovered video link. Additionally, the computer readable medium includes one or more instructions for downloading at least one video object based on at least information associated with the discovered video link, one or more instructions for processing information associated with the downloaded video object, one or more instructions for determining a first fingerprint for the downloaded video object based on at least information associated with the downloaded video object, one or more instructions for processing information associated with at least the first fingerprint for the downloaded video object, and one or more instructions for determining a match between the downloaded video object and a video title that is being tracked based on at least information associated with the first fingerprint and a second fingerprint. The second fingerprint corresponds to the video title. Moreover, the computer readable medium includes one or more instructions for updating a second database for storing one or more tracking results, and one or more instructions for obtaining information associated with the video object from the second database. The obtained information is associated with at least the predetermined website. Also, the computer readable medium includes one or more instructions for verifying whether the video object still exists on the predetermined website based on at least information associated with the predetermined website. Additionally, the computer readable medium includes one or more instructions for, if the video object is verified to still exist on the predetermined website, downloading updated information associated with the video object from the predetermined website, and storing the updated information associated with the video object to the second database. Moreover, the computer readable medium includes one or more instructions for, if the video object is verified to no longer exist on the predetermined website, marking the video object as having been removed from the predetermined website. Also, the computer readable medium includes one or more instructions for updating a display of the one or more tracking results. For example, the computer program product is implemented according to FIGS. 1, 2, and/or 3.

Many benefits are achieved by way of the present invention over conventional techniques. Certain embodiments of the present invention use one or more video fingerprints to accurately identify videos in a fully automatic workflow. Some embodiments of the present invention provide a user interface for presenting the tracking data in a timely and dynamic way.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for discovering and identifying a video object, the method comprising:
    crawling at least one predetermined website;
    discovering at least one video link at the predetermined website;
    processing information associated with a first database for storing one or more video links;
    determining whether the discovered video link was already discovered before based on at least information associated with the first database;
    if the discovered video link is determined not to have been discovered before,
        updating the first database based on at least information associated with the discovered video link;
        downloading at least one video object based on at least information associated with the discovered video link;
        processing information associated with the downloaded video object;
        determining a first fingerprint for the downloaded video object based on at least information associated with the downloaded video object;
        processing information associated with at least the first fingerprint for the downloaded video object;
        determining whether the downloaded video object matches with a video title that is being tracked based on at least information associated with the first fingerprint and a second fingerprint, the second fingerprint corresponding to the video title;
        if the downloaded video object is determined to match with the video title that is being tracked, updating a second database for storing one or more tracking results.

2. The method of claim 1, and further comprising:
    if the downloaded video object is determined to match with the video title that is being tracked, updating a display of one or more tracking results.

3. The method of claim 1, and further comprising:
    before performing the process of processing information associated with a first database for storing one or more video links,
        storing the discovered video link to a third database for storing one or more crawling results;
        obtaining the discovered video link from the third database.

4. The method of claim 3 wherein the third database for storing one or more crawling results includes a queue for storing the one or more crawling results.

5. The method of claim 4 wherein the process of storing the discovered video link to a third database and the process of obtaining the discovered video link from the third database are performed in a first-in-first-out manner.

6. The method of claim 5, and further comprising determining whether there is any video link that is stored in the third database but has not yet been processed.

7. The method of claim 1 wherein the process of crawling at least one predetermined website includes traversing the predetermined website using a depth-first algorithm and/or a width-first algorithm.

8. The method of claim 1 wherein the process of crawling at least one predetermined website includes searching the predetermined website with one or more predetermined keywords.

9. The method of claim 1 wherein the process of determining whether the downloaded video object matches with a video title that is being tracked includes:
    querying a third database for storing information associated with one or more fingerprints, the one or more fingerprints including the second fingerprint and corresponding to one or more video titles that are being tracked respectively;
    determining whether the downloaded video object matches with any of the one or more video titles based on at least information associated with the first fingerprint and the one or more fingerprints.

10. The method of claim 9 wherein the process of determining whether the downloaded video object matches with any of the one or more video titles includes comparing the first fingerprint with at least the second fingerprint.

11. A computer program product including a computer readable medium including instructions for discovering and identifying a video object, the computer readable medium comprising:
    one or more instructions for crawling at least one predetermined website;
    one or more instructions for discovering at least one video link at the predetermined website;
    one or more instructions for processing information associated with a first database for storing one or more video links;
    one or more instructions for determining whether the discovered video link was already discovered before based on at least information associated with the first database;
    one or more instructions for if the discovered video link is determined not to have been discovered before,
        updating the first database based on at least information associated with the discovered video link;
        downloading at least one video object based on at least information associated with the discovered video link;
        processing information associated with the downloaded video object;
        determining a first fingerprint for the downloaded video object based on at least information associated with the downloaded video object;
        processing information associated with at least the first fingerprint for the downloaded video object;
        determining whether the downloaded video object matches with a video title that is being tracked based on at least information associated with the first fingerprint and a second fingerprint, the second fingerprint corresponding to the video title;
        if the downloaded video object is determined to match with the video title that is being tracked, updating a second database for storing one or more tracking results.

* * * * *